(12) United States Patent
Kitazawa

(10) Patent No.: US 8,331,204 B2
(45) Date of Patent: Dec. 11, 2012

(54) NEAR-FIELD LIGHT GENERATING DEVICE, RECORDING HEAD, AND RECORDING DEVICE

(75) Inventor: Tazuko Kitazawa, Osaka (JP)

(73) Assignee: Sharp Kabushiki Kaisha, Osaka-Shi, Osaka (JP)

( * ) Notice: Subject to any disclaimer, the term of this patent is extended or adjusted under 35 U.S.C. 154(b) by 24 days.

(21) Appl. No.: 13/158,881

(22) Filed: Jun. 13, 2011

(65) Prior Publication Data

US 2011/0305121 A1    Dec. 15, 2011

(30) Foreign Application Priority Data

Jun. 14, 2010 (JP) ................................. 2010-135373
May 12, 2011 (JP) ................................. 2011-107652

(51) Int. Cl.
*G11B 11/00* (2006.01)
(52) U.S. Cl. .................. 369/13.24; 369/112.27
(58) Field of Classification Search .................. None
See application file for complete search history.

(56) References Cited

U.S. PATENT DOCUMENTS

| 7,440,660 | B1 | 10/2008 | Jin et al. |
| 2006/0075417 | A1 | 4/2006 | Miyanishi et al. |
| 2007/0041119 | A1 | 2/2007 | Matsumoto et al. |
| 2009/0106783 | A1 | 4/2009 | Miyanishi et al. |
| 2009/0168220 | A1 | 7/2009 | Komura et al. |
| 2009/0310459 | A1 | 12/2009 | Gage et al. |
| 2010/0061199 | A1 | 3/2010 | Hirara et al. |
| 2010/0074063 | A1 | 3/2010 | Peng et al. |
| 2010/0328807 | A1 | 12/2010 | Snyder et al. |
| 2011/0085425 | A1 | 4/2011 | Kitazawa et al. |

FOREIGN PATENT DOCUMENTS

| JP | 2005-004901 A | 1/2005 |
| JP | 2006-120294 A | 5/2006 |
| JP | 2006-351091 A | 12/2006 |
| JP | 4081480 B2 | 4/2008 |
| JP | 2008-152897 A | 7/2008 |
| JP | 2009-37661 A | 2/2009 |

(Continued)

OTHER PUBLICATIONS

Gramotnev, D.K. "Adiabatic Nanofocusing of Plasmons by Sharp Metallic Grooves: Geometrical Optics Approach," Journal of Applied Physics 98, 104302 (2005).

(Continued)

*Primary Examiner* — Paul Huber
(74) *Attorney, Agent, or Firm* — Edwards Wildman Palmer LLP; David G. Conlin; David J. Silvia

(57) ABSTRACT

A near-field light generating device (10) which converts incident light into near-field light, includes: a metallic member (11) made of a metallic material; and a dielectric member (12) made of a dielectric material, the metallic member (11) having a first interface (16) and a second interface (18) that sandwich the dielectric member (12), the first interface (16) and the second interface (18) having flections (P16 and P18), respectively, an inner-interface distance, which is a distance between the first interface (16) and the second interface (18), being minimum at location of the flections (P16 and P18), and a rate of change of the inner-interface distance between the first interface (16) and the second interface (18) being asymmetrical with respect to the flections (P16 and P18). With the arrangement, it is possible to provide a minute near-field light generating device which can be easily fabricated and which can obtain high-intensity near-field light whose temporal change in intensity is small.

16 Claims, 20 Drawing Sheets

FOREIGN PATENT DOCUMENTS

| | | |
|---|---|---|
| JP | 2009-99255 | 5/2009 |
| JP | 2009-163806 A | 7/2009 |
| JP | 2009-193644 | 8/2009 |

OTHER PUBLICATIONS

Pile, D.F.P., Gramotnev, D.K., Haraguchi, M., Okamoto, T. and Fukui, M. "Numerical Analysis of Coupled Wedge Plasmons in a Structure of Two Metal Wedges Separated by a Gap," Journal of Applied Physics 100. 013101 (2006).

Haraguchi, M., Pile, D.F.P., Okamoto, T., Fukui, M. and Gramontnev, D.K. "New Plasmon Waveguides Composed of Twin Metal Wedges with a Nano Gap," Optical Review 13, pp. 228-230 (2006).

Akagi, F., Igarashi, M., Nakamura, A. Mochizuki, M., Saga, H., Matsumoto, T. and Ishikawa, K. "Optimum Timing and Position of Light Irradiation for Thermally Assisted Perpendicular Recording," Japanese Journal of Applied Physics 43, No. 11A, pp. 7483-7488 (2004).

Office Action in co-pending U.S. Appl. No. 12/923,355, issued on Aug. 1, 2012.

US 8,331,204 B2

NEAR-FIELD LIGHT GENERATING DEVICE, RECORDING HEAD, AND RECORDING DEVICE

This Nonprovisional application claims priority under 35 U.S.C. §119(a) on Patent Application No. 2010-135373 filed in Japan on Jun. 14, 2010, and Patent Application No. 2011-107652 filed in Japan on May 12, 2011, the entire contents of which are hereby incorporated by reference.

TECHNICAL FIELD

The present invention relates to a near-field light generating device, a recording head, and a recording device.

BACKGROUND ART

Recently, near-field light generating devices are vigorously developed which convert propagating light into near-field light. Application of the near-field light generating devices to an optical circuit, a recording head, and a recording device is actively proposed. In the field of optical recording, miniaturization of an optical spot is advanced for a higher recording density. In view of this, use of near-field light is proposed. In the use of near-field light, a high intensity of near-field light is required for a high S/N ratio. For this reason, a near-field light generating device is used which converts propagating light into near-field light by, particularly, a surface plasmon polariton technology.

For optically-assisted magnetic recording, it is necessary to take into consideration relative positions of a near-field light generating device, a magnetic pole, and a reproducing element.

For example, in an optically-assisted magnetic recording head disclosed in Patent Literature 1, a metal film having an aperture at an output terminal of a semiconductor laser is formed so that near-field light may be generated, by the metal film, through the use of surface plasmon polariton enhancement. FIG. 18 is a view illustrating an arrangement of the metal film disclosed in Patent Literature 1. As shown in FIG. 18, the metal film 95 has a cross-like aperture 96. Near-field light is generated between vertexes that are adjacent in a polarization direction which vertexes appear as a result of formation of the cross-like aperture.

In an optically-assisted magnetic recording head disclosed in Patent Literature 2, electrically conductive scatterers for generating near-field light are disposed within a magnetic field generating coil. An internal width of the coil is equal to or smaller than a wavelength of light that enters the coil, and an outside diameter of the coil is larger than a spot diameter of light that enters the coil. The arrangement shown in FIG. 19 is disclosed as an exemplary arrangement of a head including a coil and scatterers.

FIG. 19 is a diagram illustrating an arrangement of the head disclosed in Patent Literature 2 which includes a coil and scatterers. As shown in FIG. 19, two metal scatterers 92 having a triangular shape are disposed so as to be in contact with a magnetic field generating coil 93.

In a case where the scatterers 92 are irradiated with incident light having a polarization direction as indicated by the arrow of FIG. 19, near-field light is generated in the scatterers 92. Meanwhile, a magnetic field is generated at a central part of the magnetic field generating coil 93 by passing an electric current through the magnetic field generating coil 93. Accordingly, in a case where the scatterers 92 are formed at the center of the magnetic field generating coil 93, a magnetic field and near-field light can be generated at the same location.

Meanwhile, Non-patent Literature 1 teaches that in a case where light polarized in a width direction of a V-shaped groove enters a V-shaped near-field light generating device, generated surface plasmon polaritons converge at a tip of the V-shaped groove. This is described below with reference to (a) through (d) of FIG. 20.

(a) of FIG. 20 is a perspective view illustrating an arrangement of a near-field light generating device disclosed in Non-patent Literature 1. (b) of FIG. 20 is a cross-sectional view of the near-field light generating device of (a) of FIG. 20, in which view a cross section parallel to an X-Y plane is illustrated. (c) of FIG. 20 is a cross-sectional view of the near-field light generating device of (a) of FIG. 20, in which view a cross section parallel to an Y-Z plane and propagation of surface plasmon polaritons are illustrated. (d) of FIG. 20 is a diagram illustrating the propagation illustrated in (c) of FIG. 20.

As illustrated in (a) of FIG. 20, X, Y, and Z axes are assumed. A near-field light generating device 100 consists of a metallic member 101 and a dielectric member 102. The metallic member 101 has a groove whose cross-section parallel with an X-Y plane is a V-shape. The dielectric member 102 is provided in the groove.

As illustrated in (b) of FIG. 20, a width, in a direction of an X-axis, of the groove formed in the metallic member 101 (i.e., a width of the dielectric member 102) becomes narrower from a plus direction of a Y-axis to a minus direction of the Y-axis. The narrower the width in the direction of the X-axis, the larger the effective refractive index for surface plasmon polaritons excited in a case where light polarized in the direction of the X-axis enters the near-field light generating device 100. In this case, a track of the surface plasmon polaritons propagating through the groove in the metallic member 101 is indicated by the arrow A in (c) of FIG. 20. That is, the surface plasmon polaritons change their propagation direction toward a tip of the groove.

If incident light travels from a medium having a small refractive index to a medium having a large refractive index, θ4<θ3 is satisfied by Snell's law, as illustrated in (d) of FIG. 20. Since a groove of a V-shaped near-field light generating device such as the near-field light generating device 100 is considered to be a group of layers in which a refractive index gradually changes, the surface plasmon polaritons propagating through the groove in the metallic member 101 converge at the tip of the V-shape of the groove.

As indicated by the dashed line in (d) of FIG. 20, usually, light (surface plasmon polaritons) is reflected on an interface between two media which are different in refractive index from each other. However, if a difference between the refractive indexes of the two media is very small, a reflectance is very small. That is, decreasing an angle of an opening of the V-shape of the groove makes it possible to decrease a change in effective refractive index. As a result, reflection of the light can be suppressed in the V-shaped near-field light generating device 100 so that the surface plasmon polaritons may be converged at a Z-axis (i.e., at the tip of the groove).

Further, Non-patent Literatures 2 and 3 teach that there exists a coupling mode of surface plasmon polaritons propagating along vertexes of two metal wedges facing each other.

FIG. 21 is a perspective view illustrating an arrangement of the near-field light generating device disclosed in Non-patent Literature 2. As shown in FIG. 21, the near-field light generating device 200 includes a metal wedge 200a and a metal wedge 200b, each of which is made of a metallic material. The metal wedge 200a and the metal wedge 200b are disposed so as to face each other and so that their respective vertexes are away from each other. Surface plasmon polaritons propagate in a direction (X-axis direction of FIG. 21) in which the vertex of the metal wedge 200a and the vertex of the metal wedge 200b extend.

Which of the phenomenon described in Non-patent Literature 1 and the phenomenon described in Non-patent Literatures 2 and 3 occurs depends on a vertex of a V-shaped near-field light generating device (or metal wedges), a direction in which surface plasmon polaritons enter a flection, and inner-interface distance at the location of the flection and in the vicinity of the flection.

CITATION LIST

Patent Literature 1
Japanese Patent Application Publication, Tokukai, No. 2006-351091 A (Publication Date: Dec. 28, 2006)
Patent Literature 2
Japanese Patent No. 4081480 (Registration Date: Feb. 15, 2008)
Patent Literature 3
Japanese Patent Application Publication, Tokukai, No. 2009-163806 A (Publication Date: Jul. 23, 2009)
Patent Literature 4
Japanese Patent Application Publication, Tokukai, No. 2005-4901 A (Publication Date: Jan. 6, 2005)
Non-Patent Literature 1
"Adiabatic nanofocusing of plasmons by sharp metallic grooves: Geometrical optics approach," D. K. Gramotnev, J. App. Phys. 98, 104302 (2005)
Non-Patent Literature 2
"Numerical analysis of coupled wedge plasmons in a structure of two metal wedges separated by a gap" D. F. Pile et al., J. App. Phys. 100, 013101 (2006)
Non-Patent Literature 3
"New Plasmon Waveguides Composed of Twin Metal Wedges with a Nano Gap" Masanobu Haraguchi et al., Optical Review 13, 228 (2006)
Non-Patent Literature 4
"Japanese Journal of Applied Physics" vol. 43, No. 11A, 2004, pp. 7483-7488

SUMMARY OF INVENTION

Technical Problem

However, the methods of Patent Literatures 1 and 2 cause a temporal change, more specifically, causes vertexes to be out of shape since high-intensity near-field light is generated at the vertexes. That is, the methods of Patent Literatures 1 and 2 causes a problem that a temporal change in intensity of near-field light occurs.

Further, also in the near-field light generating devices disclosed in Non-patent Literatures 2 and 3, intensities of surface plasmon polaritons converge on vertexes of metal wedges, and therefore the vertexes melt. This causes a temporal change of obtained near-field light. That is, the near-field light generating devices disclosed in Non-patent Literatures 2 and 3 cause a problem that surface plasmon polaritons propagating through the vertexes of the metal wedges and near-field light that is ultimately obtained undergo a temporal change.

Further, according to the arrangement disclosed in Non-patent Literature 1 that has been explained with reference to FIG. 20, a tip of a V-shape at which near-field light is generated needs to be made sharp in order that near-field light of a sufficiently high intensity is obtained. Accordingly, fabrication of a near-field light generating device is difficult. As a result, near-field light of sufficiently high intensity cannot be obtained.

The present invention was attained in view of the above problems, and an object of the present invention is to provide a near-field light generating device, a recording head, and a recording device, each of which can be easily fabricated and each of which can obtain minute near-field light whose intensity is high and undergoes only a small temporal change.

Solution to Problem

In order to attain the above object, a near-field light generating device of the present invention which converts incident light into near-field light, includes: a metallic member made of a metallic material; and a dielectric member made of a dielectric material, the metallic member having a first interface and a second interface that sandwich the dielectric member, at least one of the first interface and the second interface having a flection, an inner-interface distance, which is a distance between the first interface and the second interface, being minimum at a location of the flection, and a rate of change of the inner-interface distance between the first interface and the second interface being asymmetrical with respect to the flection.

According to the arrangement, the metallic member has a first interface and a second interface that sandwich the dielectric member. This allows incident light entering the metallic member to be converted into surface plasmon polaritons by the first interface and the second interface.

Further, according to the arrangement, at least one of the first interface and the second interface has a flection, and an inner-interface distance, which is a distance between the first interface and the second interface, is minimum at a location of the flection.

This allows surface plasmon polaritons propagating along the first interface and the second interface to be converged in the vicinity of the flection where an effective refractive index is largest.

That is, according to the arrangement, it is possible to change a propagating direction of the surface plasmon polaritons excited on a light incident surface side of the first interface and the second interface and to converge the surface plasmon polaritons in the vicinity of the flection on a light exit surface side of the first interface and the second interface. The surface plasmon polaritons thus converged in the vicinity of the flection are minute surface plasmon polaritons of high intensity.

This makes it possible to emit, from the light exit surface of the near-field light generating device, near-field light of a minute spot size and of a high intensity.

According to the arrangement, it is thus possible to efficiently convert incident light into near-field light whose spot size is small.

Further, according to the arrangement, a rate of change of the inner-interface distance between the first interface and the second interface is asymmetrical with respect to the flection. This allows surface plasmon polaritons propagating along the first interface and the second interface to be converged away from the flection. This makes it possible to reduce a heat-induced temporal change in shape of the flection where the inner-interface distance is minimum. That is, it is possible to reduce a temporal change in intensity of generated near-field light.

Further, according to the arrangement, the flection is provided so that a rate of change of the inner-interface distance between the first interface and the second interface is asymmetrical with respect to the flection. Accordingly, the flection for converging surface plasmon polaritons is easier to create, as compared with the arrangement in which surface plasmon polaritons are converged on a tip of a V-shaped groove.

According to the arrangement, it is therefore possible to provide a near-field light generating device that can be easily fabricated and that makes it possible to obtain minute near-field light whose intensity is high and undergoes only a small temporal change.

Advantageous Effects of Invention

In order to attain the above object, a near-field light generating device of the present invention which converts incident light into near-field light, includes: a metallic member made of a metallic material; and a dielectric member made of a dielectric material, the metallic member having a first interface and a second interface that sandwich the dielectric member, at least one of the first interface and the second interface having a flection, an inner-interface distance, which is a distance between the first interface and the second interface, being minimum at a location of the flection, and a rate of change of the inner-interface distance between the first interface and the second interface being asymmetrical with respect to the flection.

This produces an effect that it is possible to provide a near-field light generating device that can be easily fabricated and that makes it possible to obtain minute near-field light whose intensity is high and undergoes only a small temporal change.

DESCRIPTION OF EMBODIMENTS

An embodiment of the present invention is described below. The following description deals with a near-field light generating device 10 of an embodiment of the present invention with reference to FIGS. 1 through 12.

(Arrangement of Near-Field Light Generating Device)

First, an arrangement of the near-field light generating device 10 of the present embodiment is described with reference to FIGS. 1 and 2.

Figure 1:
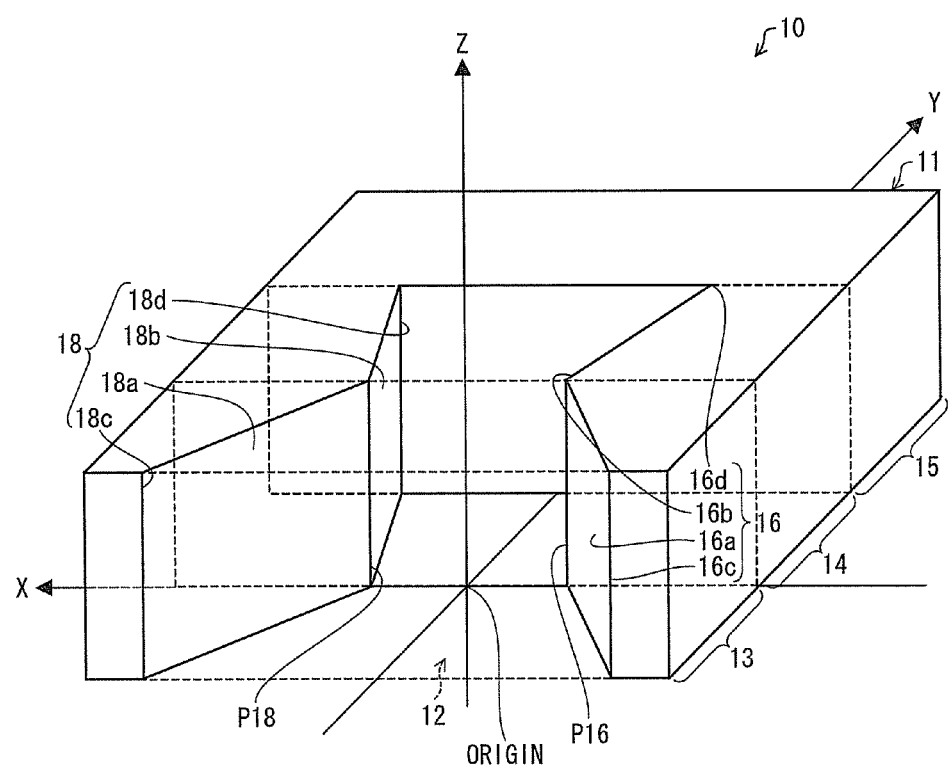
FIG. 1
FIG. 1 is a perspective view illustrating a near-field light generating device of the present invention.

FIG. 1 is a perspective view illustrating an outline arrangement of the near-field light generating device 10 of the present embodiment. FIG. 2 is a diagram illustrating a light incident surface of the near-field light generating device 10 of the present embodiment.

The near-field light generating device 10 includes a metallic member 11 made of a metallic material and a dielectric member 12 made of a dielectric material. A surface of the near-field light generating device 10 which surface is irradiated with light is the light incident surface. The near-field light generating device 10 converts incident light entered from a light incident surface side into surface plasmon polaritons, and causes the surface plasmon polaritons thus obtained to be emitted, as near-field light, from a light exit surface which is opposite to the light incident surface.

The metallic material of which the metallic member 11 is made may be any material which highly excites surface plasmon polaritons although it depends on a wavelength of incident light entering the metallic member 11. Specifically, it is preferable that the metallic material of which the metallic member 11 is made contain, as a main component, metal, silver, copper, platinum, chromium, or aluminum.

The material of which the dielectric member 12 is made can be any material which allows transmission of light having a wavelength of the light source. Specifically, the dielectric member 12 can be air; an oxide such as silicon oxide, glasses, aluminum oxide, and titanium oxide; and a nitride such as aluminum nitride.

The metallic member 11 has a first interface 16 and a second interface 18 which are interfaces between the metallic member 11 and the dielectric member 12. The first interface 16 and the second interface 18 face each other so as to sandwich the dielectric member 12 therebetween so as to incline to each other.

The first interface 16 and the second interface 18 are symmetrically formed with respect to a symmetric axis.

The first interface 16 has first interfaces 16a and 16b, and a flection P16 which is formed between the first interfaces 16a and 16b and along which the first interface 16 is bent.

The second interface 18 has second interfaces 18a and 18b, and a flection P18 which is formed between the second interfaces 18a and 18b and along which the second interface 18 is bent.

The first interface 16 has an end 16c (one end) and an end 16d (the other end), and the second interface 18 has an end 18c (one end) and an end 18d (the other end). An inner-interface distance between the end 16c and the end 18c is different from a distance between the end 16d and the end 18d.

Although the following description deals with a case where the near-field light generating device 10 is arranged such that the first interface 16 has the flection P16 and the second interface 18 has the flection P18, it is only necessary that the near-field light generating device 10 of the present invention be arranged such that (i) at least one of the first interface 16 and the second interface 18 has a flection and (ii) an inner-interface distance between the first interface 16 and the second interface 18 is minimum at a location of this flection.

An inner-interface distance between the flection P16 and the flection P18 is a distance in a direction in which the inner-interface distance becomes minimum.

In the following description, the near-field light generating device 10 is divided into three areas: a first area 13, a second area 14, and a third area 15 which are adjacently provided in this order.

The first area 13 and the second area 14 are partitioned from each other by the flections P16 and P18. The first area 13 is an area which the first interface 16a and the second interface 18a face, and the second area 14 is an area which the first interface 16b and the second interface 18b face.

Each of the first area 13 and the second area 14 is an area including (i) an area of the metallic member 11 which area sandwiches the dielectric member 12 and (ii) an area of the dielectric member 12 which area is sandwiched by the metallic member 11. The first area 13 and the second area 14 are bordered (partitioned) from each other in reference to the flections P16 and P18.

The third area 15 is bordered (partitioned) from the first area 13 and the second area 14 in reference to the end 16d of the first interface 16 and the end 18d of the second interface 18.

Of interfaces constituting the first interface 16, the first interface 16a and the end 16c are included in the first area 13, and the first interface 16b and the end 16d are included in the second area 14.

Of interfaces constituting the second interface 18, the second interface 18a and the end 18c are included in the first area 13, and the second interface 18b and the end 18d are included in the second area 14.

The third area 15 is an area which does not include the dielectric member 12 but consists of only a part of the metallic member 11. The third area 15 connects the end 16d of the first interface 16 and the end 18d of the interface 18 that are included in the second area 14.

A position where near-field light is generated in the light exit surface of the near-field light generating device 10 can be adjusted by adjusting a distance between the flection P16 and the end 16d of the first interface 16 and a distance between the flection P18 and the end 18d of the second interface 18. Further, a magnetic field can be generated by passing an electric current through the metallic member 11.

Further, parts of the metallic member 11 which are included in the first area 13 and the second area 14 are connected to each other in the third area 15. This improves strength of the near-field light generating device 10.

An inner interface distance between the end 16d and the end 18d which face each other is smaller than an inner-interface distance between the end 16c and the end 18c which face each other.

Accordingly, by causing incident light to enter the near-field light generating device 10 so that a center of intensities of the incident light is located in the second area 14, it is possible to prevent the incident light from passing through the near-field light generating device 10 without exciting surface plasmon polaritons. Consequently, according to the near-field light generating device 10, it is possible to improve use efficiency of incident light.

The following description assumes an X-axis, a Y-axis, and a Z-axis, as illustrated in FIG. 1 etc. Specifically, the X-axis extends in a direction in which the inner-interface distance between the first interface 16 and the second interface 18 becomes minimum (i.e., direction in which a straight line connecting the flection P16 and the flection P18 extends). A boundary surface between the first area 13 and the second area 14 is an X-Z plane. A direction perpendicular to the X-axis and the Z-axis is a Y-axis direction.

As for two directions of the Z-axis, a direction from the light exit surface of the near-field light generating device 10 to the light incident surface of the near-field light generating device 10 is referred to as a + (plus) direction of the Z-axis whereas an opposite direction is referred to as a − (minus) direction of the Z-axis. As for two directions of the X-axis, a direction from the first interface 16 to the second interface 18 is referred to as a + direction of the X-axis whereas an opposite direction is referred to as a − direction of the X-axis. As for two directions of the Y-axis, a direction from the first area 13 to the second area 14 is referred to as a + direction of the Y-axis, whereas a direction from the second area 14 to the first area 13 is referred to as a − direction of the Y-axis.

The near-field light generating device 10 is symmetrical with respect to the Y-axis which serves as a symmetrical axis. That is, the first interface 16 and the second interface 18 are symmetrical to each other with respect to the Y-axis.

The inter-interface distance between the first interface 16 and the second interface 18 can be described as an inter-interface distance in a direction perpendicular to the Y-axis which is the symmetrical axis.

(Inter-Interface Distance of Near-Field Light Generating Device)

Next, the following description deals with a relationship between (i) a rate of change of an inner-interface distance between the first interface 16 and the second interface 18 of the near-field light generating device 10 and (ii) the flections P16 and P18.

The rate of change of the inner-interface distance of the near-field light generating device 10 depends on (i) an angle formed between a tangent to the first interface 16a and a tangent to the second interface 18a and an angle formed between a tangent to the first interface 16b and a tangent formed between the second interface 18b or (ii) a differential value of the inner-interface distance which corresponds to a value of Y.

Figure 2:
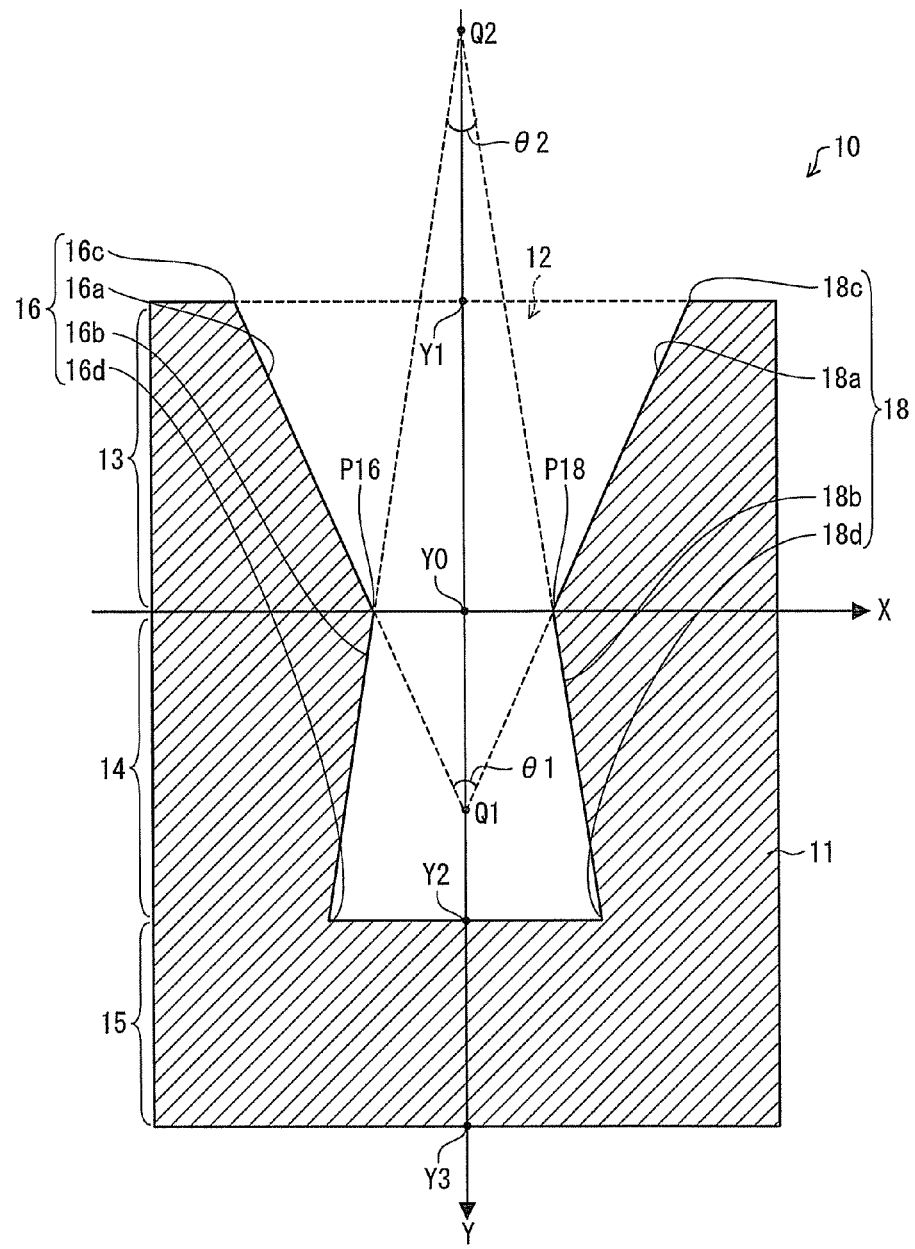
FIG. 2
FIG. 2 is a cross-sectional view illustrating the near-field light generating device of the present invention.

First, with reference to FIG. 2, the relationship between (i) a rate of change of an inner-interface distance of the near-field light generating device 10 and (ii) the flections P16 and P18 is described by using the angle formed between the tangent to the first interface 16a and the tangent to the second interface 18a at a position on the Y-axis and the angle formed between the tangent to the first interface 16b and the tangent formed between the second interface 18b at a position on the Y-axis.

As shown in FIG. 2, a position at which an extended line (i.e., the tangent to the first interface 16a) of the first interface 16a of the first area 13 intersects with an extended line (i.e., the tangent to the second interface 18a) of the second interface 18a of the first area 13 is referred to as Q1. An angle formed between the extended line of the first interface 16a of the first area 13 and the extended line of the second interface 18a of the first area 13 (i.e., an angle formed by the end 16c, the position Q1, and the end 18c) is referred to as a first vertex angle θ1 (θ1 in FIG. 2).

Further, a position at which an extended line (i.e., the tangent to the first interface 16b) of the first interface 16b of the second area 14 intersects with an extended line (i.e., the tangent to the second interface 18b) of the second interface 18b of the second area 14 is referred to as Q2. An angle formed between the extended line of the first interface 16b of the second area 14 and the extended line of the second interface 18b of the second area 14 (i.e., an angle formed by the flection P16, the position Q2, and the flection P18) is referred to as a second vertex angle θ2 (θ2 in FIG. 2).

A position indicated by a Y-coordinate of the flections P16 and P18 on the X-Y cross-section of the near-field light generating device 10 is referred to as a position Y0. A position indicated by a Y-coordinate of the ends 16c and 18c on the X-Y cross-section is referred to as a position Y1. Note that the position Y1 indicates a Y-coordinate of one end surface of the near-field light generating device 10.

That is, the position Y0 is a position of a Y-coordinate at which the inner-interface distance between the first interface 16 and the second interface 18 is shortest. A position indicated by a Y-coordinate of the ends 16d and 18d is referred to as a position Y2.

A Y-coordinate of another end surface of the near-field light generating device 10 that is opposite to the one end surface located at the position Y1 is referred to as a position Y3. A distance between the position Y1 and the position Y3 is a length of the near-field light generating device 10 on the X-Y plane.

Note that the position Y0 is a position of the origin of the XYZ coordinates. Note also that, in the near-field light generating device 10, the Y-axis is a line that bisects the first vertex angle θ1 and the second vertex angle θ2.

In the first area 13, the distance between the first interface 16 and the second interface 18, each of which is an interface between the metallic member 11 and the dielectric member 12, gradually becomes smaller in the plus direction of the Y-axis, and becomes minimum at the location of the flections P16 and P18. In the second area 14, the distance between the first interface 16 and the second interface 18 gradually becomes larger in the plus direction of the Y-axis until the ends 16d and 18d are reached.

In the near-field light generating device 10, the first vertex angle θ1 is different from the second vertex angle θ2.

On a cross-section parallel to the X-Y plane of the near-field light generating device 10, a rate of change of the inner-interface distance between the first interface 16 and the second interface 18 which gradually becomes smaller or larger toward the plus direction of the Y-axis is higher in the first area 13 than in the second area 14. Accordingly, the second vertex angle θ2 is smaller than the first vertex angle θ1.

In other words, on the cross-section parallel to the X-Y plane of the near-field light generating device 10, the flections P16 and P18 can also be described as changing points which respectively change (i) a gradient of a straight line between the ends 16c and 16d and (ii) a gradient of a straight line between the ends 18d and 18c (i.e., change a rate of change of the inter-interface distance).

This can also be described as follows: In the near-field light generating device 10, the metallic member 11 has a groove which is made of the dielectric member 12, and which has, as its tip, the ends 16d and 18d, and which has side surfaces (i.e., the first interface 16 and the second interface 18) which define the width of the groove, the side surfaces being provided with the flections P16 and P18 at which a rate of decrease in width of the groove is changed, i.e., a rate of change of the inner-interface distance is changed.

As described above, in the near-field light generating device 10, a rate of change of the inner-interface distance between the first interface 16 and the second interface 18 with respect to the Y-axis is changed at the flections P16 and P18. That is, the first interfaces 16a and 16b and the second interfaces 18a and 18b are flat surfaces, and the first interface 16a and the second interface 18a are provided so as to incline to each other, and the first interface 16b and the second interface 18b are provided so as to incline to each other.

When the near-field light generating device 10 is viewed from the light incident surface side or from the light exit surface side, the near-field light generating device 10 has (i) a V-shaped portion defined by the end 16c, and the position Q1, and the end 18c and has the first vertex angle θ1, and (ii) a V-shaped portion defined by the flection P16, and the position Q2, and the flection P18 and has the second vertex angle θ2.

Note that the position Q1 is a position at which the extended line of the first interface 16a intersects with the extended line of the second interface 18a on the Y-axis, and the position Q2 is a position at which the extended line of the first interface 16b intersects with the extended line of the second interface 18b on the Y-axis.

In the near-field light generating device 10, a rate of a change of the inner-interface distance between the first interface 16 and the second interface 18 is constant between the location of the ends 16c and 18c and the location of the flections P16 and P18, and a rate of a change of the inner-interface distance between the first interface 16 and the second interface 18 is constant between the location of the flections P16 and P18 and the location of the ends 16d and 18d. That is, in a cross-section parallel to the X-Y plane of the near-field light generating device 10, each of the first interfaces 16a and 16b and the second interfaces 18a and 18b is a straight line. Accordingly, a shape of the cross-section parallel to the X-Y plane of the near-field light generating device 10 can be described as a shape obtained by combining two V-shaped portions facing each other.

As described above, in the near-field light generating device 10, the inner-interface distance between the first interface 16 and the second interface 18 is minimum at the location of the flections P16 and P18, and a rate of change of the inner-interface distance between the first interface 16 and the second interface 18 is asymmetrical with respect to the location of the flections P16 and P18 (i.e., changes at the location of the flections P16 and P18).

Figure 3:
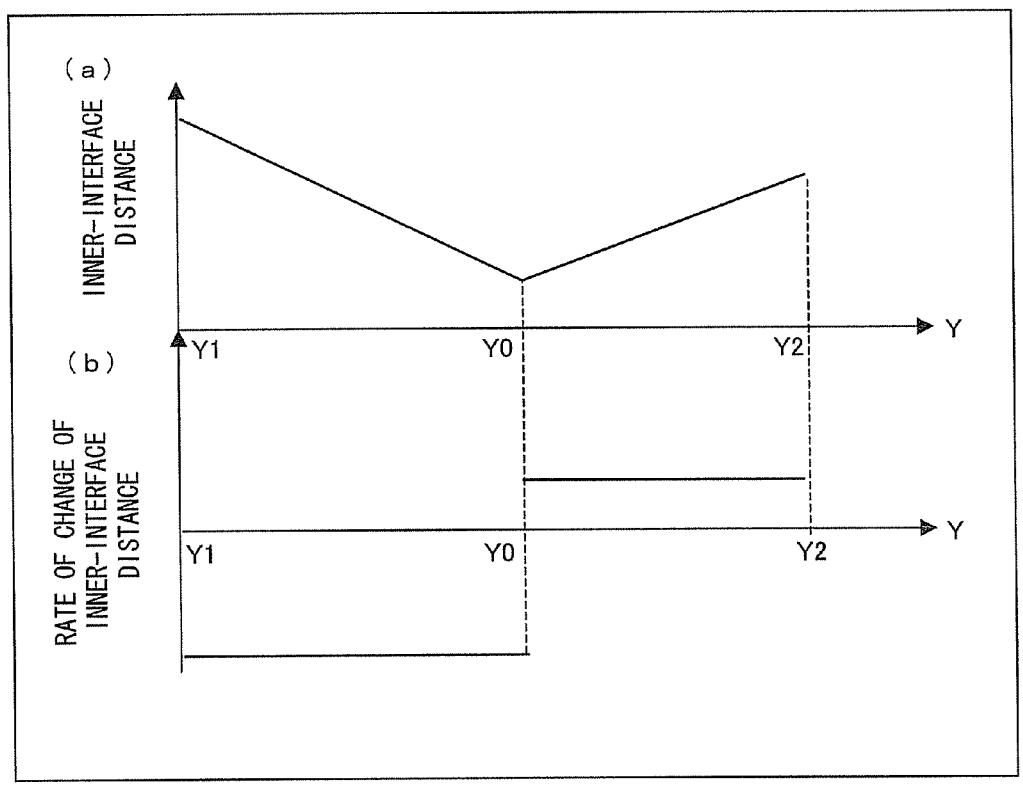
FIG. 3
(a) of FIG. 3 is a graph showing how an inter-interface distance of the near-field light generating device of the present invention changes in a Y-axis direction. (b) of FIG. 3 is a graph showing a rate of change of the inter-interface distance shown in (a) of FIG. 3.

Next, with reference to (a) and (b) of FIG. 3, the relationship between (i) a rate of change of the inner-interface distance of the near-field light generating device 10 and (ii) the flections P16 and P18 is described by using a differential value of the inner-interface distance at a position on the Y-axis.

(a) of FIG. 3 is a diagram showing how an inner-interface distance of the near-field light generating device 10 changes in the Y-axis direction, and (b) of FIG. 3 is a diagram showing a rate of change of the inner-interface distance of (a) of FIG. 3.

In (a) and (b) of FIG. 3, the horizontal axis represents the Y-axis of FIG. 2. The vertical axis in (a) of FIG. 3 represents an inner-interface distance, at a position on the Y-axis, between the first interface 16 and the second interface 18. The vertical axis in (b) of FIG. 3 represents a rate of change of the inner-interface distance of (a) of FIG. 3 at a position on the Y-axis. That is, (b) of FIG. 3 shows a differential value of the inner-interface distance of (a) of FIG. 3.

As shown in FIGS. 1 and 2, each of the first interface 16a, the second interface 18a, the first interface 16b, and the second interface 18b of the near-field light generating device 10 is a flat surface.

Accordingly, between the position Y1 and the position Y0, a rate of change of the inner-interface distance between the first interface 16a and the second interface 18a is constant, and the inner-interface distance becomes gradually smaller, as shown in (a) and (b) of FIG. 3. At the position Y0 where the flections P16 and P18 are formed, the inner-interface distance becomes minimum. A symbol (plus or minus) of the rate of the inner-interface distance is changed at the position Y0. Between the position Y0 and the position Y2, the rate of change of the inner-interface distance between the first interface 16a and the second interface 18a is constant, and the inner-interface distance becomes gradually larger.

As described above, the inner-interface distance between the first interface 16 and the second interface 18 is minimum at the location of the flections P16 and P18, and a rate of change of the inner-interface distance between the first interface 16 and the second interface 18 is asymmetrical with respect to the location of the flections P16 and P18.

(Arrangement and Advantage of Near-Field Light Generating Device)

As described above, the near-field light generating device 10 which converts incident light into near-field light includes the metallic member 11 made of a metallic material, and the dielectric member 12 made of a dielectric material, the metallic member 11 having the first interface 16 and the second interface 18 that sandwich the dielectric member 12. This allows incident light entering the metallic member 11 to be converted into surface plasmon polaritons by the first interface 16 and the second interface 18.

Further, in the near-field light generating device 10, the first interface 16 and the second interface 18 are bent at the flections P16 and P18, respectively, and the inner-interface distance, which is a distance between the first interface 16 and the second interface 18, is minimum between the flections P16 and P18.

This allows surface plasmon polaritons propagating along the first interface 16 and the second interface 18 to be converged in the vicinity of the flections P16 and P18 where an effective refractive index is largest.

That is, the above arrangement makes it possible to change a propagating direction of the surface plasmon polaritons excited on the light incident surface side of the first interface 16 and the second interface 18 so that the surface plasmon polaritons are converged in the vicinity of the flections P16 and P18 on the light exit surface side of the first interface 16 and the second interface 18. The surface plasmon polaritons converged in the vicinity of the flections P16 and P18 are surface plasmon polaritons of a minute size and of a high intensity.

Consequently, high-intensity near-field light whose spot size is minute can be emitted from the light exit surface of the near-field light generating device 10. According to the near-field light generating device 10, incident light can be thus efficiently converted into near-field light whose spot size is small.

Further, in the near-field light generating device 10, a rate of change of the inner-interface distance between the first interface 16 and the second interface 18 is asymmetrical with respect to the location of the flections P16 and P18 (i.e., changes at the location of the flections P16 and P18). In other words, the first vertex angle $\theta 1$ is different from the second vertex angle $\theta 2$.

This allows the surface plasmon polaritons propagating along the first interface 16 and the second interface 18 to be converged away from the flections P16 and P18.

Accordingly, it is possible to reduce a heat-induced temporal change in shape of the flections P16 and P18 at which the inner-interface distance is shortest. That is, it is possible to reduce a temporal change in intensity of near-field light generated in the near-field light generating device 10.

In order to reduce a size of a recording mark to be recorded on a recording medium, an optimum distance between a position at which a magnetic field is generated and a position at which near-field light is generated must be determined so that the position at which a magnetic field is generated and the position at which near-field light is generated coincide with each other not on a head but on the recording medium. That is, it is important to cause a distribution of heat generated by near-field light with which the recording medium is irradiated to coincide with a magnetic field with which the medium is irradiated.

For example, according to the arrangement of the metal film 95 of Patent Literature 1 that has been explained with reference to FIG. 18, it is necessary to adjust a position of the magnetic pole in order to adjust a position at which near-field light is generated and a position at which a magnetic field is generated. This requires highly accurate microfabrication, and is therefore difficult in practice.

Figure 19:
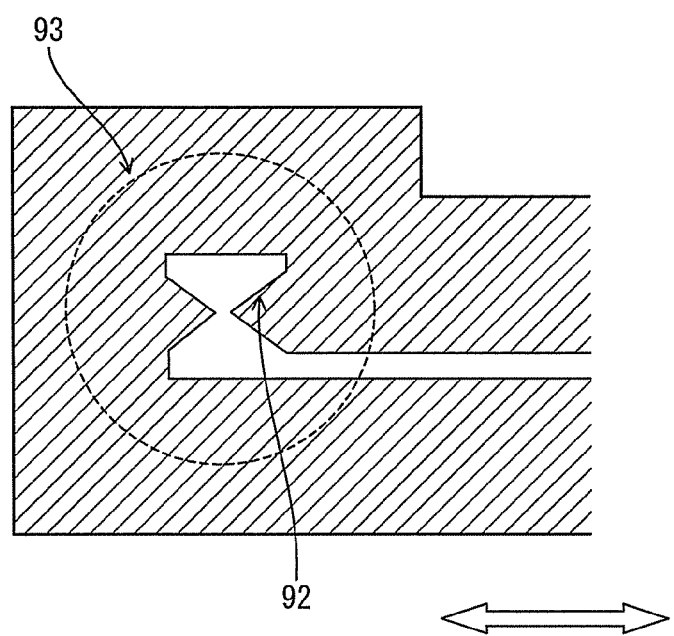
FIG. 19
FIG. 19 is a cross-sectional view illustrating an arrangement of a conventional near-field light generating device.

According to the arrangement of the metal scatterers 92 and the magnetic field generating coil 93 disclosed in Patent Literature 2 that has been explained with reference to FIG. 19, the scatterers 92 are formed so that their vertexes are located at an optimum distance from a center of the coil. This arrangement requires highly accurate microfabrication, and is therefore difficult in practice under restricting conditions that (i) an internal width of the coil be equal to or smaller than a wavelength of light that enters the coil and (ii) an outside diameter of the coil be larger than a spot diameter of light that enters the coil.

As described above, according to the methods of Patent Literatures 1 and 2, it is not practical to cause a distribution of heat generated by near-field light with which the medium is irradiated to coincide with a magnetic field with which the medium is irradiated.

According to the optically-assisted magnetic recording head disclosed in Patent Literature 3, at least a part of a main magnetic pole is located within a spot region including a region between first and second near-field light generating sections, each of which is a metallic member having a shape of a triangle pole. Accordingly, tips of the near-field light generating sections are located in proximity to the main magnetic pole, so that high-density recording is achieved.

However, also in the optically-assisted magnetic recording head disclosed in Patent Literature 3, there is no option but to adjust positions of the first and second near-field light generating sections and the main magnetic pole, as in Patent Literatures 1 and 2. This requires highly accurate microfabrication, and is therefore difficult in practice.

Meanwhile, in the near-field light generating device 10, the inner-interface distance, which is the distance between the first interface 16 and the second interface 18, is minimum at the location of the flections P16 and P18, and a rate of change of the inner-interface distance between the first interface 16 and the second interface 18 is asymmetrical with respect to the location of the flections P16 and P18.

Since, according to the near-field light generating device 10, a rate of change of the inner-interface distance between the first interface 16 and the second interface 18 is asymmetrical with respect to the location of the flections P16 and P18, it is possible to cause the surface plasmon polaritons propagating along the first interface 16 and the second interface 18 to converge away from the flections P16 and P18. Accordingly, a position at which near-field light is generated can be adjusted in the vicinity of the flections P16 and P18. This makes it possible to adjust a relation between the position at which near-field light is generated and a position at which a magnetic field is generated in the metallic member 11. That is, it is possible to shorten/adjust a distance between the position at which near-field light is generated and the position at which a magnetic field is generated by adjusting a rate of change of the inner-interface distance between the first interface 16 and the second interface 18.

Consequently, according to the near-field light generating device 10, it is possible to reduce a size of a mark to be recorded on the recording medium.

Figure 20:
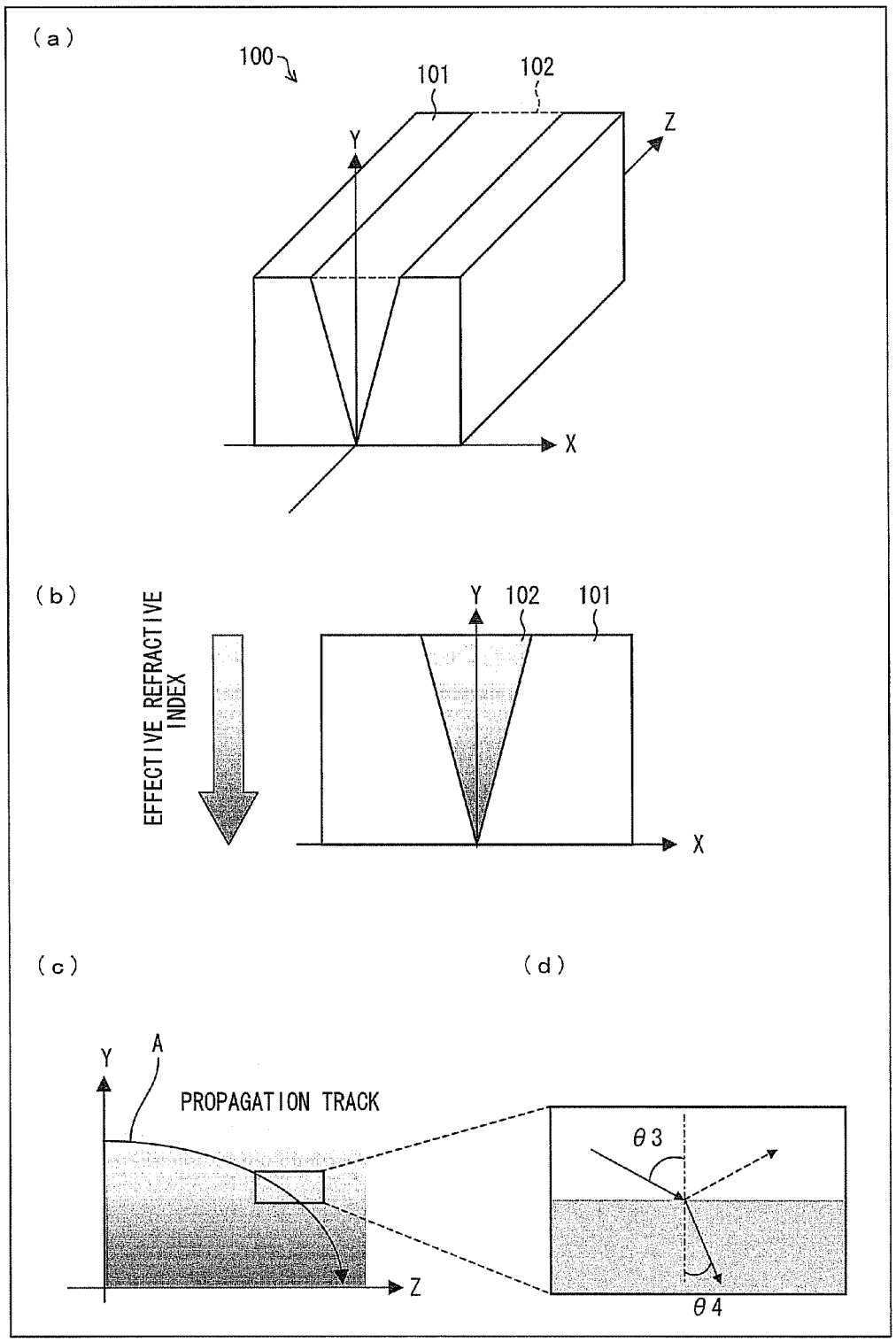
FIG. 20
(a) of FIG. 20 is a perspective view illustrating an arrangement of a conventional waveguide. (b) of FIG. 20 is a cross-sectional view illustrating the waveguide in (a) of FIG. 20 which cross-sectional view is parallel with an X-Y plane. (c) of FIG. 20 is a cross-sectional view illustrating the waveguide in (a) of FIG. 20 which cross-sectional view is parallel with a Y-Z plane and in which propagation of surface plasmon polaritons is illustrated. (d) of FIG. 20 is a diagram illustrating the propagation illustrated in (c) of FIG. 20.
Figure 21:
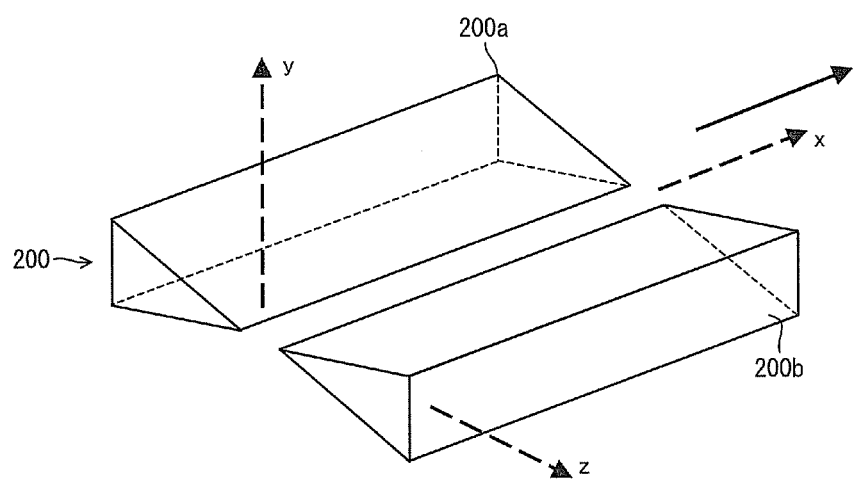
FIG. 21
FIG. 21 is a perspective view illustrating an arrangement of a conventional near-field light generating device.

According to the arrangement disclosed in Non-patent Literature 1 that has been explained with reference to FIG. 20, a tip of a V-shape at which near-field light is generated needs to be made sharp in order to obtain near-field light of a sufficient intensity. Accordingly, fabrication of a near-field light generating device is difficult. If curvature occurs at the tip of the V-shape, a distance between interfaces sandwiching the dielectric member increases depending on the curvature thus occurred, and surface plasmon polaritons are reflected by the curvature. As a result, near-field light of a sufficient intensity cannot be obtained.

Meanwhile, according to the near-field light generating device 10, the first interface 16 and the second interface 18 are provided with the flections P16 and P18, respectively, so that a rate of change of the inner-interface distance between the first interface 16 and the second interface 18 is asymmetrical with respect to the location of the flections P16 and P18. Accordingly, creation of the flections P16 and P18 is easier, as compared with a V-shaped groove as described in Non-patent Literature 1 whose tip is sharpened so that surface plasmon polaritons are converged on the tip.

According to the near-field light generating device 10, the first interface 16 and the second interface 18 are provided with the flections P16 and P18, respectively.

This structure allows an electric field to more easily converge on the flections P16 and P18, as compared with the near-field light generating device disclosed in Non-patent Literature 1 in which an inner surface of the V-shape is a flat surface.

Further, since there are light-transmitting portions on both sizes of the flections P16 and P18, a still higher intensity can be obtained. In other words, free electrons in the metallic member 11 are excited, as surface plasmon polaritons on both sides of the flections P16 and P18, by incident light, and are then converged on the flections P16 and P18.

According to the near-field light generating device, it is therefore possible to obtain near-field light having a higher intensity, as compared with the near-field light generating device disclosed in Non-patent Literature 1 which has a V-shaped groove, even if the near-field light generating devices have the same inner-interface distance. Note that in a case where at least one of the first interface 16 and the second interface 18 has a flection, an electric field can be converged on the flection.

According to the near-field light generating device 10, it is thus possible to provide a near-field light generating device that can be easily fabricated and that makes it possible to obtain minute near-field light whose intensity is high and undergoes only a small temporal change.

Further, the second vertex angle $\theta_2$ is smaller than the first vertex angle $\theta_1$. Accordingly, by causing incident light to enter the near-field light generating device 10 so that a center of intensities of the incident light is located in the second area 14, it is possible to prevent the incident light from passing through the near-field light generating device 10 without exciting surface plasmon polaritons. Consequently, according to the near-field light generating device 10, it is possible to improve a use efficiency of incident light.

Each of the first vertex angle $\theta_1$ and the second vertex angle $\theta_2$ is larger than 0° and less than 180°, more preferably, larger than 0° and not more than 90°.

This makes it possible (i) to reduce an area of the first interface 16 and the second interface 18 in which area the inner-interface distance is equal to or larger than a wavelength of incident light and through which the incident light passes without exciting surface plasmon polaritons and (ii) to keep the area away from an area where near-field light is generated. Accordingly, in the near-field light generating device 10, it is possible to eliminate background noise of obtained near-field light or to reduce an effect of the background noise.

Further, in the near-field light generating device 10, the flections P16 and P18 are formed on the first interface 16 and the second interface 18, respectively, and the first interface 16 and the second interface 18 are symmetrical to each other with respect to the Y-axis.

Accordingly, an electric field component of surface plasmon polaritons acting between the first interface 16 and the second interface 18 is always oriented in a constant direction. This decreases a loss of the surface plasmon polaritons propagating along the first interface 16 and the second interface 18. As a result, an intensity of near-field light to be obtained is increased. That is, incident light can be efficiently converted into near-field light whose spot size is small.

Further, the light which enters the near-field light generating device 10 is linearly-polarized light whose polarization direction includes at least a polarization direction parallel to a direction (the X-axis direction) in which the inner-interface distance between the first interface 16 and the second interface 18 becomes minimum.

This increases an excitation intensity of the surface plasmon polaritons propagating along the first interface 16 and the second interface 18. As a result, an intensity of the near-field light to be obtained is increased. That is, the incident light can be efficiently converted into near-field light whose spot size is small.

Figure 18:
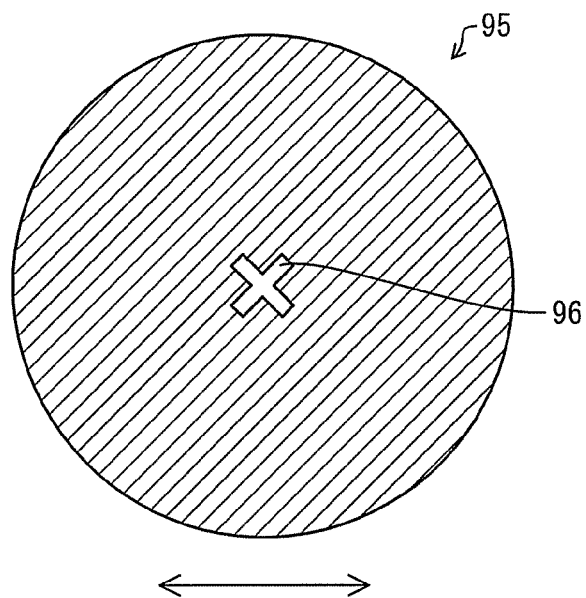
FIG. 18
FIG. 18 is a plan view illustrating an arrangement of a conventional near-field light generating device.

Since the aperture 96 of the metal film 95 shown in FIG. 18 has a cross shape, a portion which shields light is present in the vicinity of a desired pair of apexes. Accordingly, most of incident light entering the metal film is reflected by the metal film. As a result, a use efficiency of a semiconductor laser is poor.

Similarly, according to the method of Patent Literature 3, in which the main magnetic pole is located within a spot region including a region between first and second near-field light generating sections that is irradiated with incident light, most of the incident light is reflected/diffused by the main magnetic pole. As a result, a use efficiency of light is poor.

Meanwhile, in the near-field light generating device 10, only the dielectric member 12, which is made of a dielectric material which allows transmission of light entering the near-field light generating device 10, is disposed in an area sandwiched by the first interface 16 and the second interface 18.

According to the arrangement, only a dielectric material which allows transmission of light entering the near-field light generating device 10 is present in the area sandwiched by the first interface 16 and the second interface 18. That is, there is no member that shields light entering between the first interface 16 and the second interface 18. Accordingly, the light entering between the first interface 16 and the second interface 18 can be efficiently converted into near-field light.

Such a dielectric material which allows transmission of light entering the near-field light generating device can be air; an oxide such as silicon oxide, glasses, aluminum oxide, and titanium oxide; and a nitride such as aluminum nitride, as described above.

Since there is no member that shields light entering between the first interface 16 and the second interface 18, it is possible to efficiently excite surface plasmon polaritons from the light entering between the first interface 16 and the second interface 18. This improves an efficiency of conversion into near-field light.

(Modification 1 of Near-Field Light Generating Device)

Figure 4:
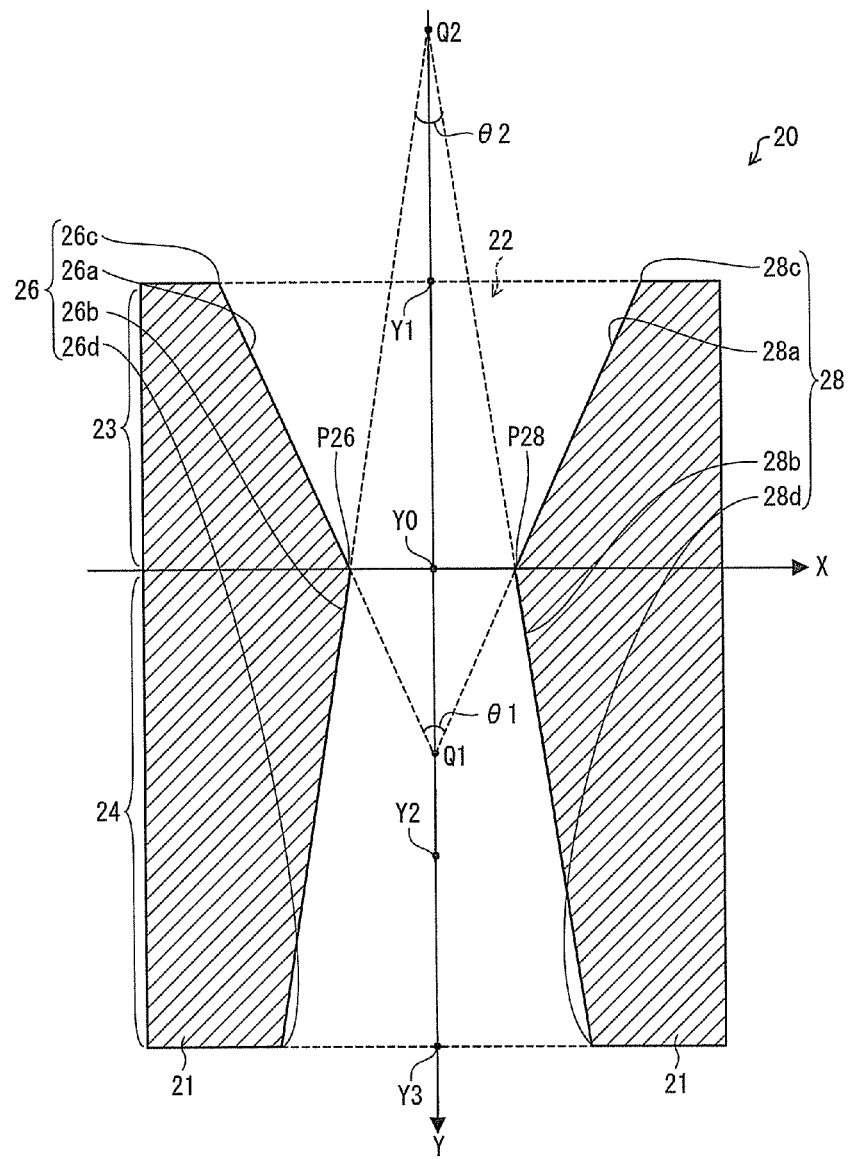
FIG. 4
FIG. 4 is a cross-sectional view illustrating a near-field light generating device of the present invention.

With reference to FIG. 4, the following describes an arrangement of a near-field light generating device 20, which is a modification of the near-field light generating device 10.

In the near-field light generating device 10 shown in FIGS. 1 and 2, the ends 16d and 18d are connected to each other by an interface between the third area 15 and the dielectric member 12. However, it is also possible that ends 26d and 28d are not connected to each other, as in the near-field light generating device 20 shown in FIG. 4.

FIG. 4 is a cross-sectional view illustrating a first modification of the near-field light generating device of the present embodiment.

The near-field light generating device 20 shown in FIG. 4 has an arrangement such that the dielectric member 12 penetrates the third area 15 of the metallic member 11 in the near-field light generating device 10. That is, in the near-field light generating device 20, a pair of metallic members 21a and 21b are provided which are separated from each other and which are symmetrical to each other with respect to the Y-axis serving as a symmetrical axis.

The near-field light generating device 20 includes a metallic member 21 made of a metallic material and a dielectric member 22 made of a dielectric material. The metallic member 21 is constituted by the metallic members 21a and 21b which are symmetrically disposed so as to sandwich the dielectric member 22.

A first interface 26 has first interfaces 26a and 26b and ends 26c and 26d which are similar to the first interfaces 16a and 16b and the ends 16c and 16d of the first interface 16, respectively. A second interface 28 has second interfaces 28a and 28b and ends 28c and 28d which are similar to the second interfaces 18a and 18b and the ends 18c and 18d of the second interface 18, respectively.

Like the first interface 13 and the second interface 14, each of the first area 23 and the second area 24 is an area including (i) areas of the metallic members 21a and 21b which areas sandwich the dielectric member 22 and (ii) an area of the dielectric member 22 which area is sandwiched by the metallic members 21a and 21b. The first area 23 and the second area 24 are bordered (partitioned) from each other in reference to flections P26 and P28.

As to an inner-interface distance between the first interface 26 and the second interface 18, an inner interface distance between the flections P26 and P28 is shorter than an inner interface distance between the ends 26d and 28d, and the inner-interface distance between the ends 26d and 28d is shorter than an inner interface distance between the ends 26c and 28c.

That is, in the near-field light generating device 20, the inner-interface distance between the first interface 26 and the second interface 28 is minimum at the location of the flections P26 and P28, and a rate of change of the inner-interface distance between the first interface 26 and the second interface 28 is asymmetrical with respect to the location of the flections P26 and P28.

Further, in the near-field light generating device 20, a distance between the flection P26 and the end 26d and a distance between the flection P28 and the end 28d are longer than a distance between the flection P26 and the end 26c and a distance between the flection P28 and the end 28c, respectively. Accordingly, areas of the first interface 26b and the second interface 28b, which sandwich a position Y2 serving as a center of intensities of incident light entering the near-field light generating device 20, are larger than those of the first interface 26a and the second interface 28a. This makes it possible to obtain a higher excitation intensity of surface plasmon polaritons. Consequently, in the near-field light generating device 20, it is possible to obtain near-field light having a still higher intensity than the near-field light generating device 10.

(Near-Field Light)

The following describes near-field light generated in the near-field light generating devices 10 and 20 of the present embodiment, with reference to FIGS. 2, 4, and 5 through 8 which show simulation results obtained by use of an FDTD (Finite-Difference Time-Domain) method.

Figure 5:
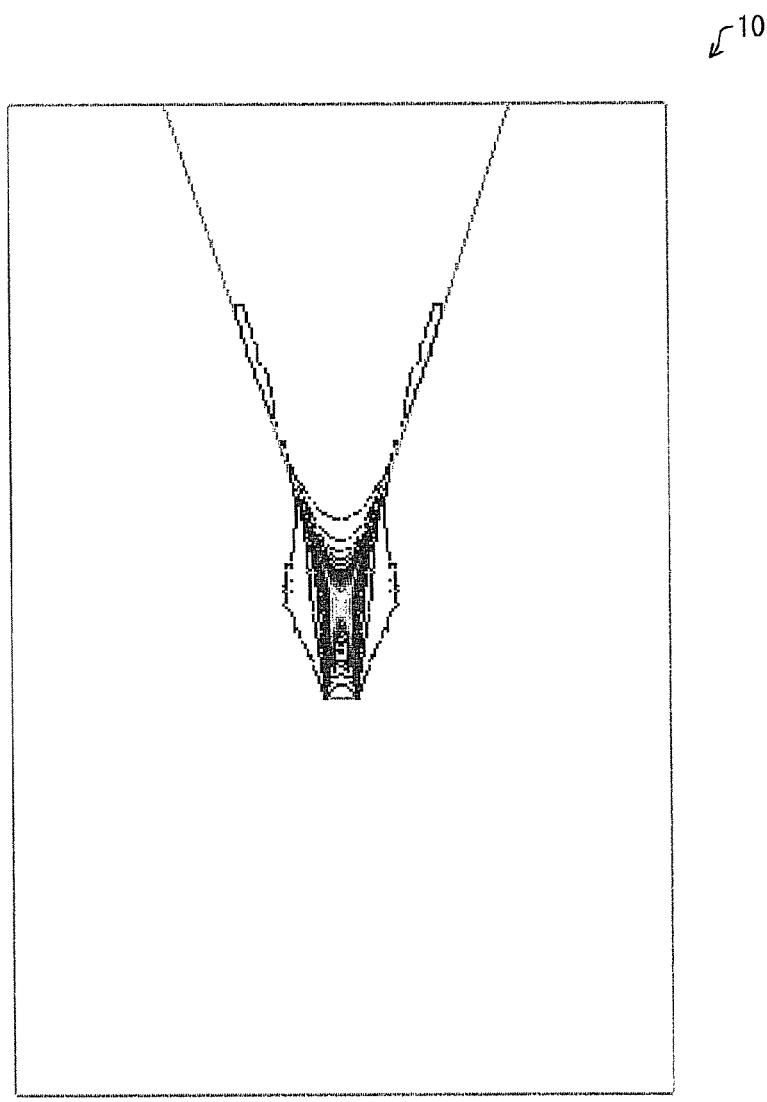
FIG. 5
FIG. 5 is a diagram showing an intensity distribution on a light exit surface that is obtained in a case where the near-field light generating device of the present invention is irradiated with light.

FIG. 5 is a diagram showing an intensity distribution of surface plasmon polaritons which intensity distribution is obtained on a light exit surface in a case where the first vertex angle θ1 is larger than the second vertex angle θ2 in the near-field light generating device 10 of FIG. 2.

Figure 6:
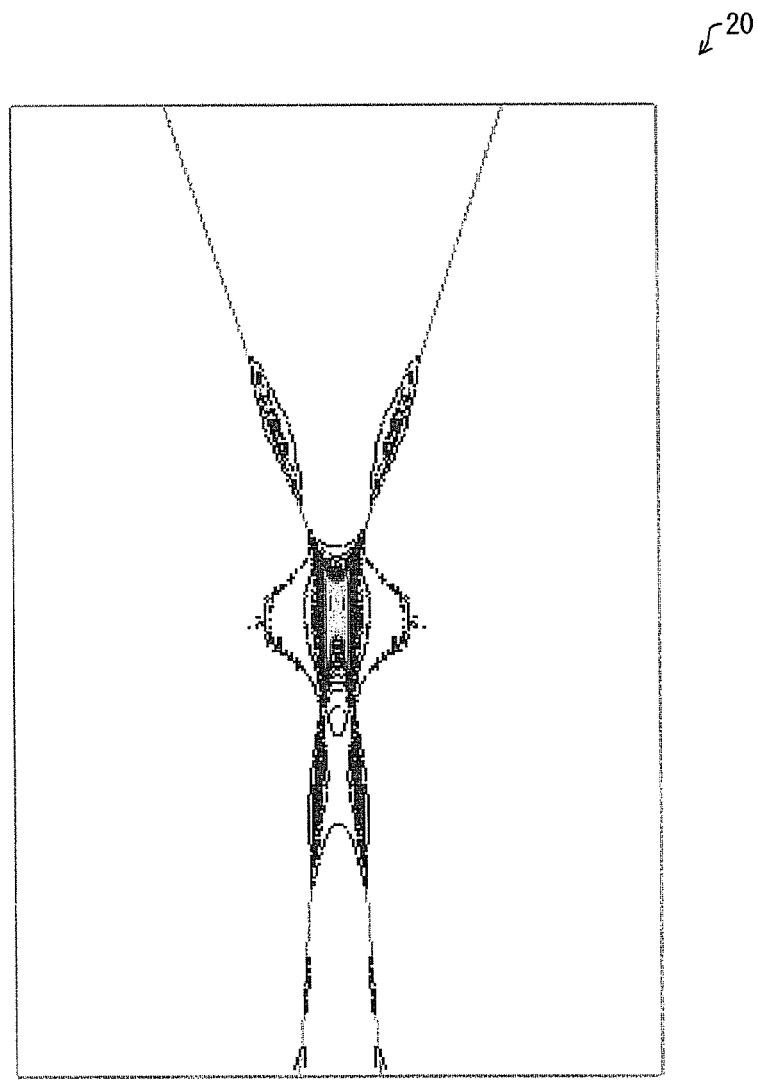
FIG. 6
FIG. 6 is a diagram showing an intensity distribution on a light exit surface that is obtained in a case where the near-field light generating device of the present invention is irradiated with light.

FIG. 6 is a diagram showing an intensity distribution of surface plasmon polaritons which intensity distribution is obtained on a light exit surface in a case where the first vertex angle θ1 is larger than the second vertex angle θ2 in the near-field light generating device 20 of FIG. 4.

Figure 7:
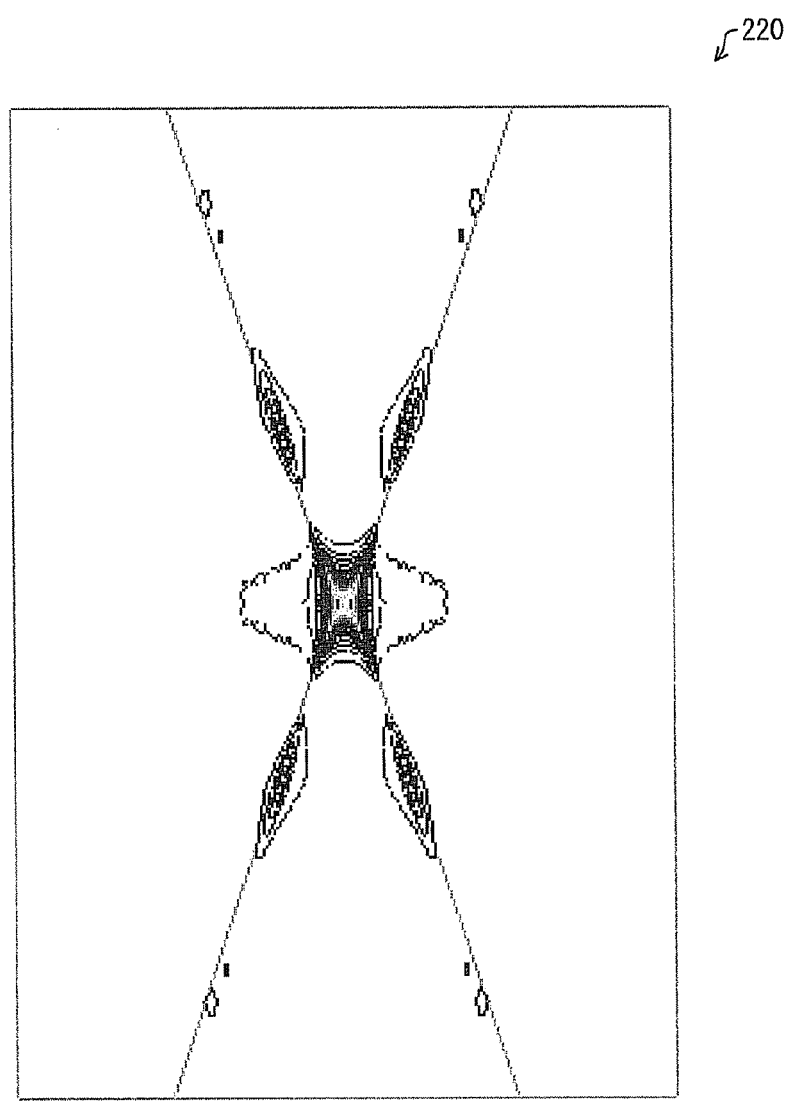
FIG. 7
FIG. 7 is a diagram showing an intensity distribution on a light exit surface that is obtained in a case where a near-field light generating device of a comparative example is irradiated with light.

FIG. 7 is a diagram showing an intensity distribution of surface plasmon polaritons which intensity distribution is obtained on a light exit surface of a near-field light generating device 220, i.e., the near-field light generating device 20 shown in FIG. 4 in which the first vertex angle θ1 is equal to the second vertex angle θ2.

In the simulation shown in FIG. 5, a film thickness was 500 nm; the first vertex angle θ1 was 36.9°; and the second vertex angle θ2 was 20.8° in the near-field light generating device 10 shown in FIG. 2.

In the simulation shown in FIG. 6, a film thickness was 500 nm; the first vertex angle θ1 was 36.9°; and the second vertex angle θ2 was 7.6° in the near-field light generating device 20 shown in FIG. 4.

In the simulation shown in FIG. 7, a film thickness was 500 nm; and both of the first vertex angle θ1 and the second vertex angle θ2 was 36.9° in the near-field light generating device 20 shown in FIG. 4.

In each of the simulations, a distance between Y0 and Y2 was 300 nm.

Figure 8:
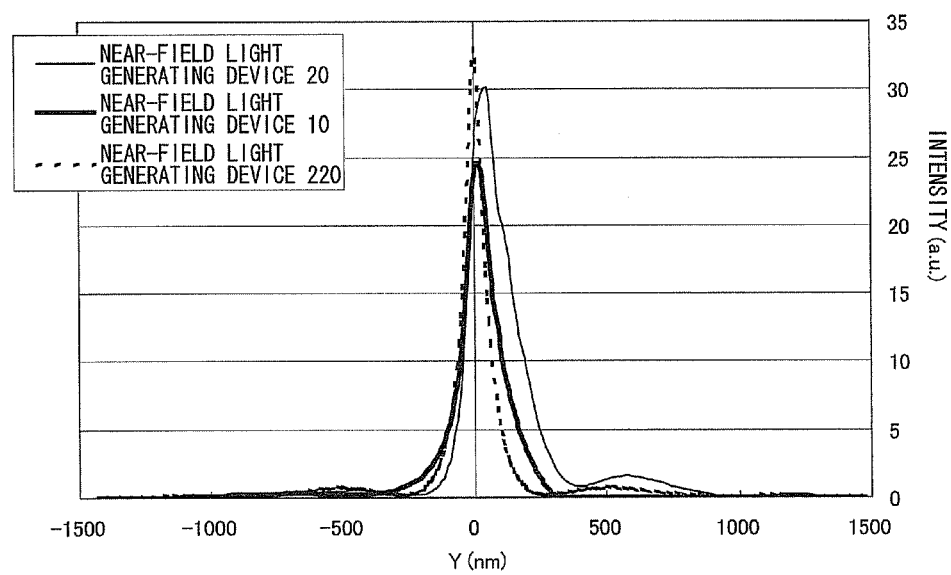
FIG. 8
FIG. 8 is a diagram showing an intensity distribution, in a Y direction, on the light exit surfaces of the near-field light generating devices of the present invention and the near-field light generating device of the comparative example.

FIG. 8 is a graph showing intensity distributions on the Y-axes of FIGS. 2 and 4 which intensity distributions are obtained as a result of the simulations shown in FIGS. 5 through 7.

In each of the simulations, incident light had a wavelength of 780 nm and had intensities that form such a Gaussian distribution that the incident light has an intensity of $1/e^2$ in a case where the incident light has radiation angles of 10° in the X-direction and 20° in the Y-direction. In each of the simulations, a center of intensities of the incident light was set to the position Y2 (see FIG. 2 etc.) on the light incident surface. A polarization direction of the incident light was the X-axis direction. In each of the simulations, an inner-interface distance at the position Y0 was 50 nm.

The results shown in FIG. 8 reveal that the near-field light generating device 20 (see FIG. 6) in which the second area 24 is large is higher in maximal intensity of surface plasmon polaritons in the vicinity of the position Y0, as compared with the near-field light generating device 10 (see FIG. 5) in which the second area 14 is small. It can be hypothesized that this is because the near-field light generating device 20 can utilize a larger amount of light than the near-field light generating device 10.

In the near-field light generating device 220, the first vertex angle θ1 was equal to the second vertex angle θ2. Accordingly, in the near-field light generating device 220, a maximal intensity of surface plasmon polaritons is located in the position Y0, as shown in FIG. 8. This accelerates a temporal deterioration of flections in the near-field light generating device 220 which are located at the position Y0 and between which an inner-interface distance is shortest.

Meanwhile, in the near-field light generating devices 10 and 20, the first vertex angle θ1 was different from the second vertex angle θ2. This allows a maximal intensity of surface plasmon polaritons to be deviated from the position Y0. Consequently, in the near-field light generating devices 10 and 20, it is possible to suppress a temporal deterioration of the flections P16 and P18 and the flections P26 and P28 between which an inner-interface distance is shortest.

Comparison between the near-field light generating devices 10, 20, and 220 only in terms of maximal intensity of surface plasmon polaritons shows that a maximal intensity of surface plasmon polaritons that is obtained in the near-field light generating devices 10 and 20 is slightly lower than that obtained in the near-field light generating device 220, as shown in FIG. 8.

However, the maximal intensity of surface plasmon polaritons that is obtained in the near-field light generating device 10 and the maximal intensity of surface plasmon polaritons that is obtained in the near-field light generating device 20 are sufficiently practical values. In addition, in the near-field light generating devices 10 and 20, the maximal intensity of surface plasmon polaritons can be deviated from the position Y0, as described above. This produces an effect of suppressing a deterioration of flections.

Consequently, according to the near-field light generating devices 10 and 20, it is possible to obtain highly-reliable near-field light having a sufficiently high intensity. On this account, the near-field light generating devices 10 and 20 are more practical than the near-field light generating device 220.

A direction in which a maximal intensity of surface plasmon polaritons generated in the near-field light generating devices 10 and 20 is deviated is a direction in which a smaller one of the first vertex angle θ1 and the second vertex angle θ2 is located. In each of the near-field light generating devices 10 and 20, the second vertex angle θ2 is smaller than the first vertex angle θ1, as described above.

Accordingly, a maximal intensity of surface plasmon polaritons generated in each of the near-field light generating devices 10 and 20 is deviated from the position Y0 in the minus direction of the Y-axis in which direction the second vertex angle θ2 is located. Note that the intensity distribution in the Y-direction expands as the first vertex angle θ1 and the second vertex angle θ2 become smaller.

It is thus possible to control a location of a maximal intensity of surface plasmon polaritons by controlling the first vertex angle θ1 and the second vertex angle θ2.

That is, it is possible to efficiently convert incident light into near-field light whose spot size is small by arranging a near-field light generating device so that, as is the case of the near-field light generating device 10 of the present embodiment, the first interface 16 between the metallic member 11 and the dielectric member 12 is constituted by the first interface 16a and the first interface 16b that are inclined to each other and the second interface between the metallic member 11 and the dielectric member 12 is constituted by the second interface 18a and the second interface 18b that are inclined to each other.

Moreover, the near-field light generating device 10 allows surface plasmon polaritons propagating along the first interface 16 and the second interface 18 to be converged in the vicinity of the flections P16 and P18. As a result, near-field light having a sufficiently high intensity can be obtained even in a case where the film thickness (distance in the Z-direction of FIG. 1) is small. According to the near-field light generating device 10, it is thus possible to efficiently convert incident light into near-field light whose spot size is small and to make the film thickness small enough for easy fabrication.

Since a rate of change of the inner-interface distance between the first interface 16a and the second interface 18a is different from that of the inner-interface distance between the first interface 16b and the second interface 18b, a light intensity distribution can be deviated from the flections. This makes it possible to prevent shapes of the flections of the metallic member 11 from changing with time due to a light intensity, thereby preventing an intensity of generated near-field light from changing with time.

The present embodiment has dealt with a case where a shape does not change in the Z-axis direction. However, it is also possible that a shape changes in the Z-axis direction, provided that the features of the present application are preserved.

For example, the examples of FIGS. 5 through 8 show the simulation results obtained in a case where the thickness (distance in the Z-direction) of the near-field light generating devices 10 and 20 is 500 nm. However, even if the near-field light generating devices 10 and 20 are used as a near-field light generating device, such as those disclosed in Patent Literatures 2 and 3, which has a different film thickness, a strong intensity can be obtained on the light exit surfaces of the near-field light generating devices 10 and 20 by adjusting structural parameters such as θ1 and θ2.

This indicates that regardless of a length (distance in the Z-direction) of the near-field light generating devices 10 and 20, the arrangement is preferable in which the first interface 16 between the metallic member 11 and the dielectric member 12 is constituted by the first interface 16a and the first interface 16b that are inclined to each other and the second interface 18 between the metallic member 11 and the dielectric member 12 is constituted by the second interface 18a and the second interface 18b that are inclined to each other.

(Modification 2 of Near-Field Light Generating Device)

Figure 9:
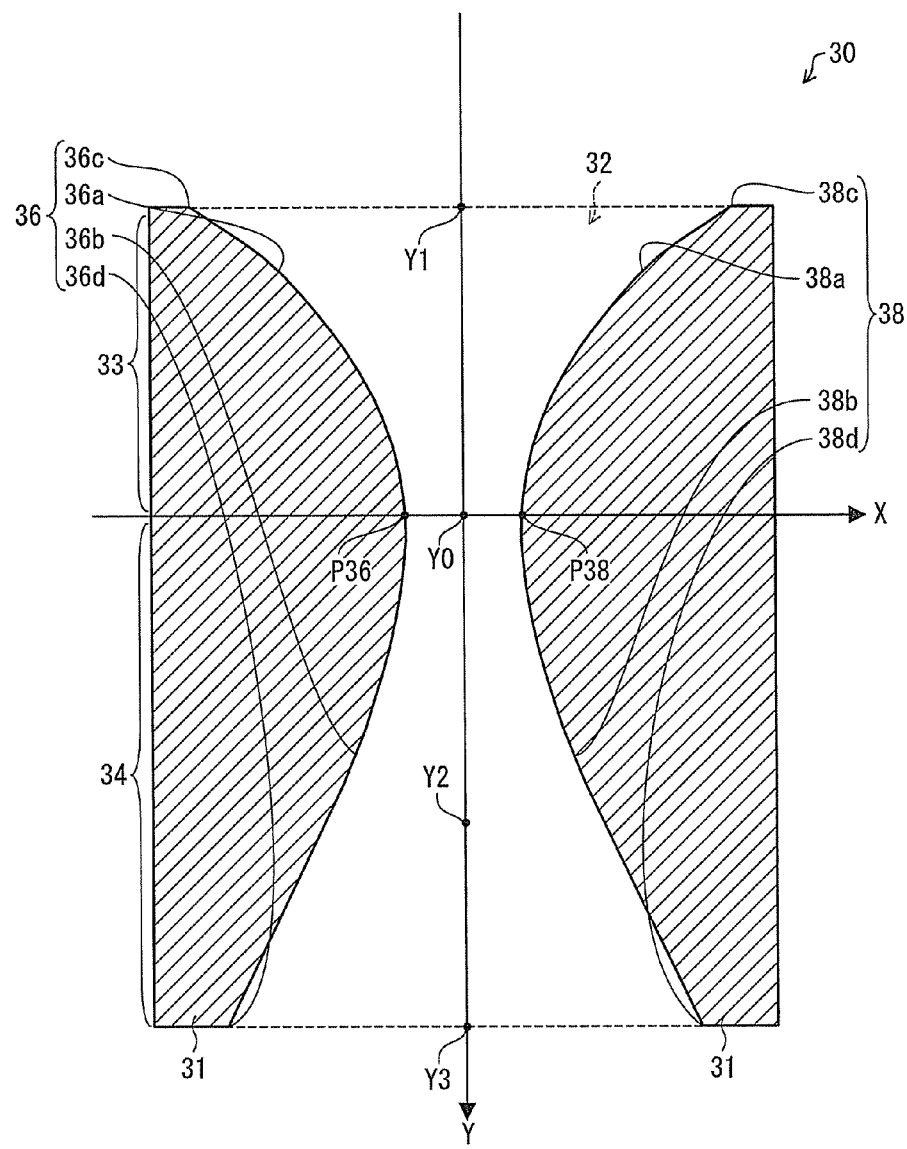
FIG. 9
FIG. 9 is a cross-sectional view illustrating another near-field light generating device of the present invention.

With reference to FIG. 9, the following describes a modification 2 of the near-field light generating devices 10 and 20. The near-field light generating device 10 may have an arrangement such as that of a near-field light generating device 30 shown in FIG. 9.

FIG. 9 is a diagram illustrating an arrangement of the near-field light generating device 30 having a first interface and a second interface that are gently curved surfaces.

The first interface 26 and the second interface 28 of the near-field light generating device 20 shown in FIG. 4 may have a curved shape as shown by a first interface 36 and a second interface 38 of FIG. 9.

As shown in FIG. 9, the first interface 36 and the second interface 38 are present between a metallic member and a dielectric member 32 of the near-field light generating device 30.

The first interface 36 is constituted by a first interface 36a and a first interface 36b that are inclined to each other. A boundary between the first interface 36a and the first interface 36b is a flection P36.

The second interface 38 is constituted by a second interface 38a and a second interface 38b that are inclined to each other. A boundary between the second interface 38a and the second interface 38b is a flection P38.

An inner-interface distance between the first interface 36 and the second interface 38 is minimum between the flections P36 and P38. A position Y0 is a position of a Y-coordinate of the flections P36 and P38.

Each of a first area 33 and a second area 34 is an area including (i) an area of the metallic member 31 which area sandwiches the dielectric member 32 and (ii) an area of the dielectric member 32 which area is sandwiched by the metallic member 31. The first area 33 and the second area 34 are bordered (partitioned) from each other in reference to the flections P36 and P38.

The first interfaces 36a and 36b and the second interfaces 38a and 38b are gently curved surfaces. The near-field light generating device 30 is similar to the near-field light generating device 20 except for the above points.

The first interfaces 36a and 36b of the first interface 36 are encompassed by the first area 33 and the second area 34, respectively. The second interfaces 38a and 38b of the second interface 38 are encompassed by the first area 33 and the second area 34, respectively.

Thus, the first interfaces 36a and 36b and the second interfaces 38a and 38b are realized as curved surfaces (i.e., are curved). As compared to a case of flat surfaces such as the first interfaces 16a and 16b and the second interfaces 18a and 18b, this makes it possible to increase (i) a rate of change of an inter-interface distance which changes from an inter-interface distance between ends 36d and 38d to an inter-interface distance between the flections P36 and P38, and (ii) a rate of change of an inter-interface distance which changes from an inter-interface distance between the flections P36 and P38 to an inter-interface distance between ends 36c and 38c.

This allows surface plasmon polaritons propagating along the first interfaces 36a and 36b and the second interfaces 38a and 38b to be more efficiently converged on the flections P36 and P38. Accordingly, it is possible to increase an intensity of near-field light to be obtained on a light exit surface of the near-field light generating device 30. That is, incident light can be efficiently converted into near-field light whose spot size is small.

Figure 10:
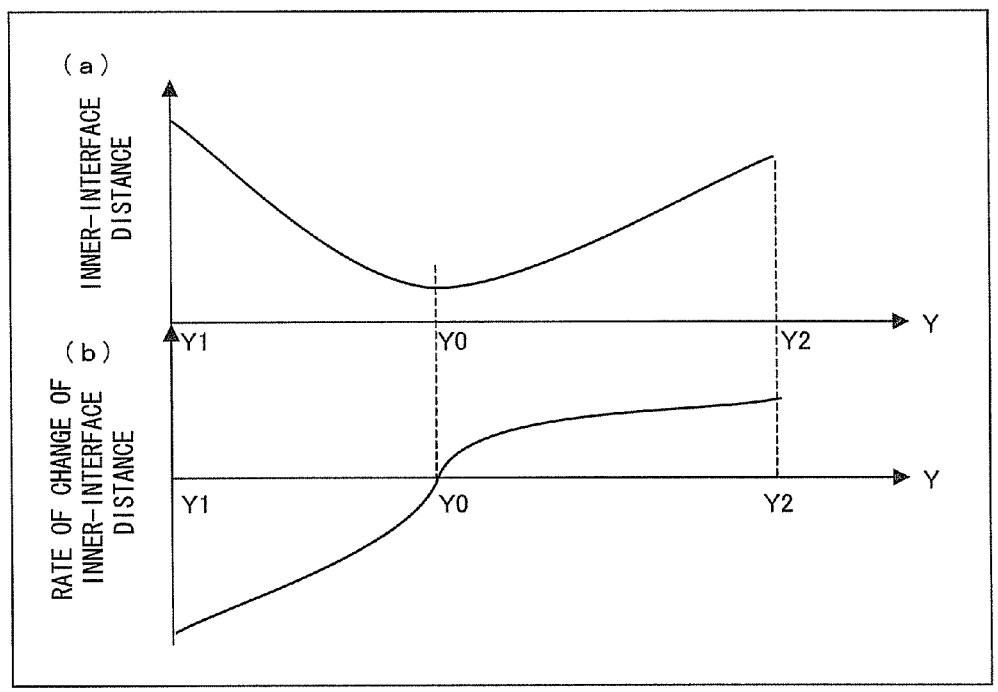
FIG. 10
(a) of FIG. 10 is a graph showing how an inter-interface distance of a second modification of the near-field light generating device of the present invention changes in the Y-axis direction. (b) of FIG. 10 is a graph showing a rate of change of the inter-interface distance shown in (a) of FIG. 10.

Next, with reference to (a) and (b) of FIG. 10, a relationship between (i) a rate of change of an inner-interface distance of the near-field light generating device 30 and (ii) the flections P36 and P38 is described by using a differential value of the inner-interface distance of the near-field light generating device 30 at a position on the Y-axis.

(a) of FIG. 10 is a diagram showing an inner-interface distance of the near-field light generating device 30 in the Y-axis direction, and (b) of FIG. 10 is a diagram showing a rate of change of the inner-interface distance of (a) of FIG. 10.

In (a) and (b) of FIG. 10, the horizontal axis represents the Y-axis of FIG. 9. The vertical axis in (a) of FIG. 10 represents a distance, at a position on the Y-axis, between the first interface 36 and the second interface 38. The vertical axis in (b) of FIG. 10 represents a rate of change of the inner-interface distance of (a) of FIG. 10 at a position on the Y-axis. That is, (b) of FIG. 10 shows a differential value of the inner-interface distance of (a) of FIG. 10.

As described above, in the near-field light generating device 30, the first interfaces 36a and 36b and the second interfaces 38a and 38b are curved, as shown in FIG. 9.

Accordingly, as shown in (a) and (b) of FIG. 10, between the positions Y1 and Y0, a rate of change of an inner-interface distance between the first interface 36a and the second interface 38a is not constant, and the inner-interface distance gradually decreases so that the ratio of change becomes sharper from the position Y1 towards the position Y0.

The inner-interface distance becomes minimum at the position Y0 where the flections P36 and P38 are formed. A symbol (plus or minus) of the rate of the inner-interface distance is changed at the position Y0. Between the position Y0 and the position Y2, the rate of change of the inner-interface distance between the first interface 36a and the second interface 38a is not constant, and the inner-interface distance gradually increases so that the ratio of change becomes more gradual from the position Y0 towards the position Y2.

As described above, the inner-interface distance between the first interface 36 and the second interface 38 is minimum between the flections P36 and P38, and a rate of change of the inner-interface distance between the first interface 36 and the second interface 38 is asymmetrical with respect to the location of the flections P36 and P38.

Figure 11:
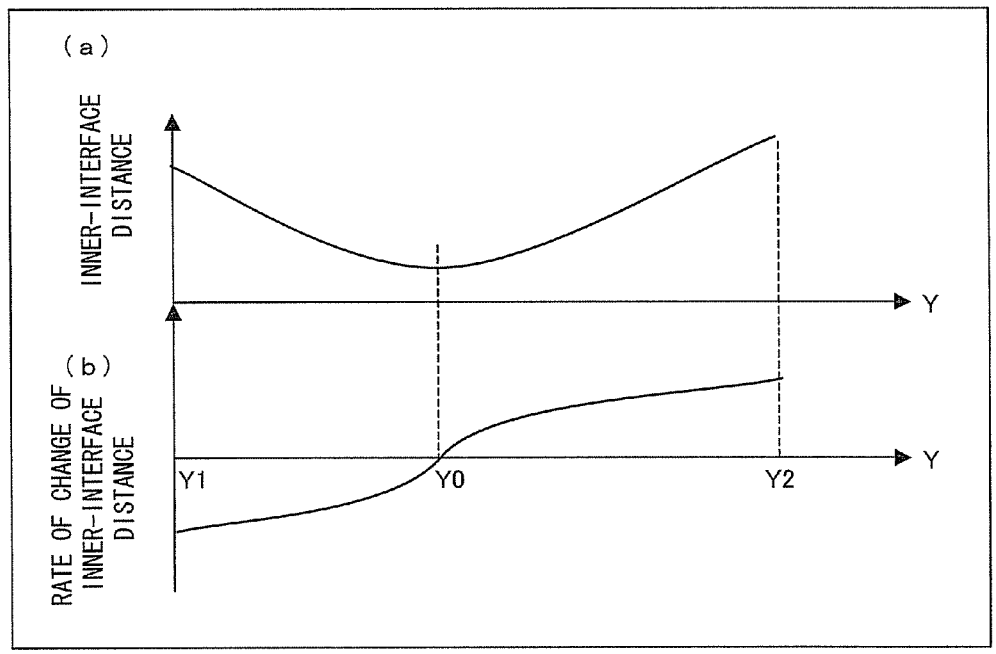
FIG. 11
(a) of FIG. 11 is a graph showing a rate of change of an inter-interface distance of a near-field light generating device of a comparative example in the Y-axis direction. (b) of FIG. 11 is a graph showing a rate of change of the inter-interface distance shown in (a) of FIG. 11.

Meanwhile, a relationship between (i) a rate of change of an inner-interface distance of the near-field light generating device 220 shown in FIG. 7 and (ii) the flections is as shown in (a) and (b) of FIG. 11.

(a) of FIG. 11 is a diagram showing an inner-interface distance of the near-field light generating device 220 in the Y-axis direction, and (b) of FIG. 11 is a diagram showing a rate of change of the inner-interface distance of (a) of FIG. 11.

As shown in (a) and (b) of FIG. 11, also in the near-field light generating device 220, between the position Y1 and the position Y0, the inner-interface distance gradually decreases so that the ratio of change of the inner-interface distance becomes sharper towards the position Y0. The inner-interface distance becomes minimum at the position Y0, and a symbol (plus or minus) of the rate of change of the inner-interface distance is changed at the position Y0. Between the position Y0 and the position Y2, the inner-interface distance gradually increases so that the ratio of change of the inner-interface distance becomes more gradual towards the position Y2.

However, as shown in (a) and (b) of FIG. 11, the near-field light generating device 220 is different from the near-field light generating device 30 in that (i) the inner-interface distance in the first area and the second area is symmetrical about a line passing through the position Y0 (i.e., the flections) and (ii) a rate of change of the inner-interface distance is symmetrical about the position Y0 (i.e., the flections).

It can be thus determined whether or not a rate of change of an inner-interface distance is changed at the location of the flections (asymmetrical with respect to the location of the flections).

Interfaces may have curvature in the vicinity of flections P36 and P38, like the first interface 36 and the second interface 38. Like, the flections P16 and P18 of the near-field light generating device 10, the flections P36 and P38 can serve as a boundary between the first interfaces 36a and 36b and a boundary between the second interfaces 38a and 38b, respectively, provided that an inner-interface distance in the vicinity of the flections P36 and P38 is sufficiently smaller than a wavelength of the surface plasmon polaritons.

The first interface 36a and the second interface 38a are curved so that curvature gradually becomes larger from the ends 36c and 38c towards the flections P36 and P38. The first interface 36b and the second interface 38b are curved so that curvature gradually becomes smaller from the flections P36 and P38 towards the ends 36d and 38d.

A rate of change of the inner-interface distance between the first interface 36 and the second interface 38 is changed at the location of the flections P36 and P38. That is, in the first interface 36 and the second interface 38, curvature of the first interface 36b and the second interface 38b is smaller than that of the first interface 36a and the second interface 38a.

Since the curvature of the first interface 36a and the second interface 38a is different from that of the first interface 36b and the second interface 38b, a position at which near-field light is generated can be deviated from the flections P36 and P38, as in the near-field light generating device 10.

(Modification 3 of Near-Field Light Generating Device)

Figure 12:
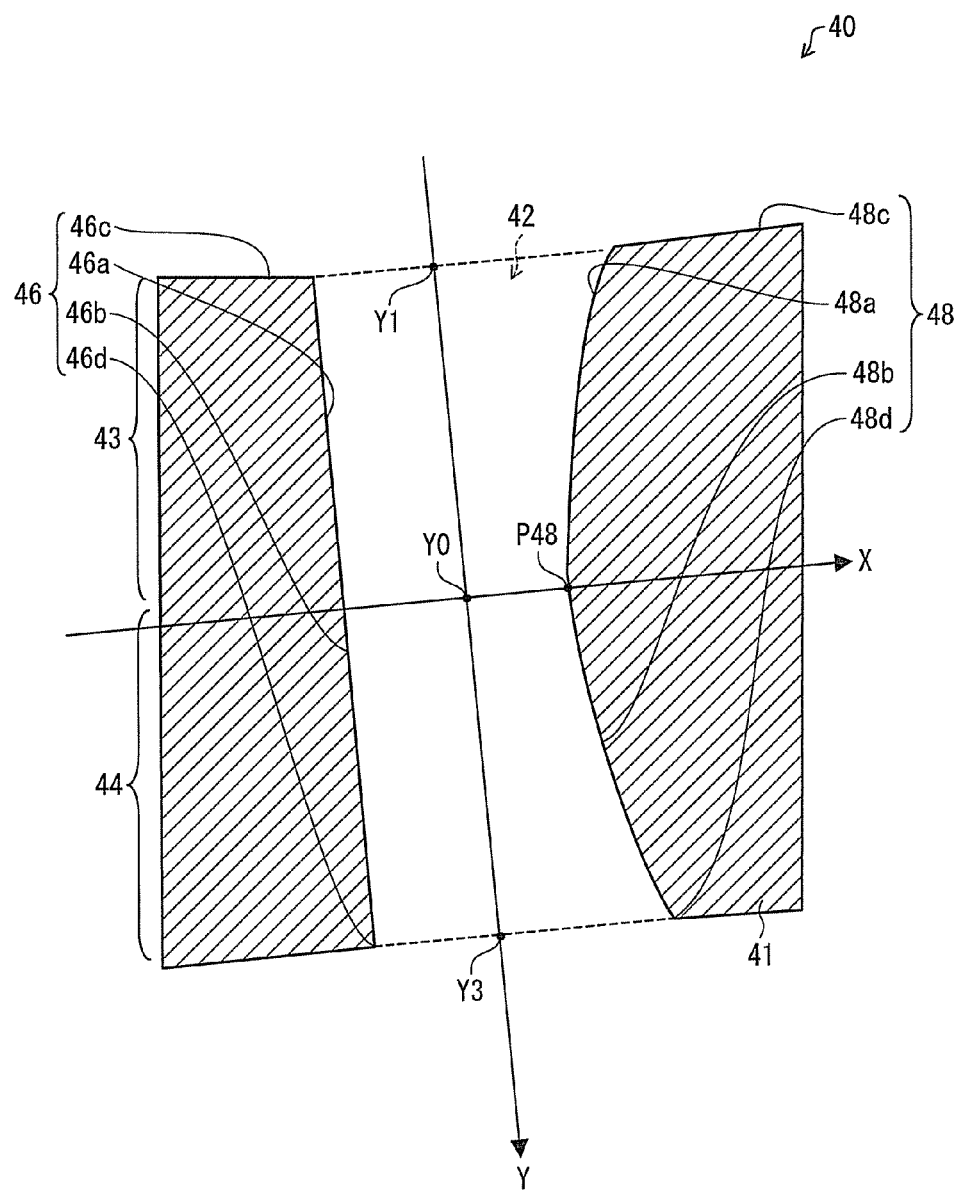
FIG. 12
FIG. 12 is a cross-sectional view illustrating another near-field light generating device of the present invention.

With reference to FIG. 12, the following describes a modification 3 of the near-field light generating devices 10 and 20. The near-field light generating device 10 may have an arrangement such as that of a near-field light generating device 40 shown in FIG. 12.

FIG. 12 is a diagram showing an arrangement of the near-field light generating device 40 in which one of two interfaces between a metallic member and a dielectric member has a flection.

The near-field light generating device 40 has an arrangement such that the first interface 36 of the metallic member 31 is a flat surface in the near-field light generating device 30. The near-field light generating device 40 has an arrangement similar to that of the near-field light generating device 30 except for this.

That is, a first interface 46 of a metallic member 41 has no flection, and is a flat surface, and a second interface 48 of the metallic member 41 has second interfaces 48a and 48b, and a flection P48 which correspond to the second interfaces 38a and 38b, and the flection P38 of the metallic member 31.

An inner-interface distance between the first interface 46 and the second interface 48 is minimum between a position of the flection P48 and a position on the first interface 46 which is opposite to the flection P48 in the X-axis direction. A position Y0 is a position of a Y-coordinate of the flection P48 and the position on the first interface 46 which is opposite to the flection P48 in the X-axis direction.

A first area 43 and a second area 44 are bordered (partitioned) from each other in reference to the flection P48.

The second interfaces 48a and 48b of the second interface 48 are encompassed by the first area 43 and the second area 44, respectively.

Each of the second interfaces 48a and 48b may be a flat surface, as in the near-field light generating device 10.

In a case where the second interfaces 48a and 48b are curved surfaces, surface plasmon polaritons propagating along the curved surfaces must constantly change their propagating direction. No problem arises if the curved surfaces have small curvatures. However, if the curved surfaces have large curvatures, there occur diffusion, reflection, etc. of the surface plasmon polaritons propagating along the curved surfaces. This leads to a loss of surface plasmon polaritons.

In a case where, as in the near-field light generating device 40, only the second interface 48 which is one of the two interfaces between the metallic member 41 and the dielectric member 42 is inflected so that the first interface 46 and the second interface 48 are asymmetrical with each other, an orientation of an electric field vector acting between the first interface 46 and the second interface 48 is changed at the location of the flection P48. This leads to a loss of surface plasmon polaritons propagating along the first interface 46 and the second interface 48.

Accordingly, an arrangement, such as the arrangement of the near-field light generating device 20, in which the first interface 26 and the second interface 28 are symmetrical to each other; the first interfaces 26a and 26b and the second interfaces 28a and 28b are flat surfaces; the first interfaces 26a and 26b are provided so as to be inclined to each other; and the second interfaces 28a and 28b are provided so as to be inclined to each other, can most effectively prevent occurrence of a loss of surface plasmon polaritons propagating along the interfaces.

A relationship between (i) a rate of change of an inner-interface distance of the near-field light generating device 40 and (ii) the flection P48 is similar to that in the near-field light generating device 30 explained with reference to (a) and (b) of FIG. 10.

That is, in a case where at least one of a first interface and a second interface is a curved surface, an inner-interface distance and a rate of change of the inner-interface distance are similar to those shown in (a) and (b) of FIG. 10.

In the near-field light generating device 40, the second interface 48a and the second interface 48b are curved.

Accordingly, between the position Y1 and the position Y0, a rate of change of an inner-interface distance between the first interface 46a and the second interface 48a is not constant, and the inner-interface distance gradually decreases so that the ratio of change of the inner-interface distance becomes sharper from the position Y1 towards the position Y0.

The inner-interface distance becomes minimum at the position Y0 at which the flection P48 is formed. A symbol (plus or minus) of the rate of change of the inner-interface distance is changed at the position Y0. Between the position Y0 and the position Y2, a rate of change of an inner-interface distance between the first interface 46b and the second interface 48b is not constant, and the inner-interface distance gradually increases so that the ratio of change of the inner-interface distance becomes more gradual from the position Y0 towards the position Y2.

As described above, the inner-interface distance between the first interface 46 and the second interface 48 becomes minimum at the location of the flection P48, and a rate of change of the inner-interface distance between the first interface 46 and the second interface 48 is asymmetrical with respect to the location of the flection P48.

The second interface 48a is curved so that curvature gradually becomes larger from the end 48c towards the flection P48. The second interface 48b is curved so that curvature gradually becomes smaller from the flection P48 towards the end 48d.

The rate of change of the inner-interface distance between the first interface 46 and the second interface 48 is changed at the location of the flection P48. Specifically, in the first interface 46 and the second interface 48, the second interface 48b has a smaller curvature than the second interface 48a.

Since the curvature of the second interface 48a is different from that of the second interface 48b, a position at which near-field light is generated can be deviated from the flection P48, as in the near-field light generating device 10.

(Method for Manufacturing Near-Field Light Generating Device)

Figure 13:
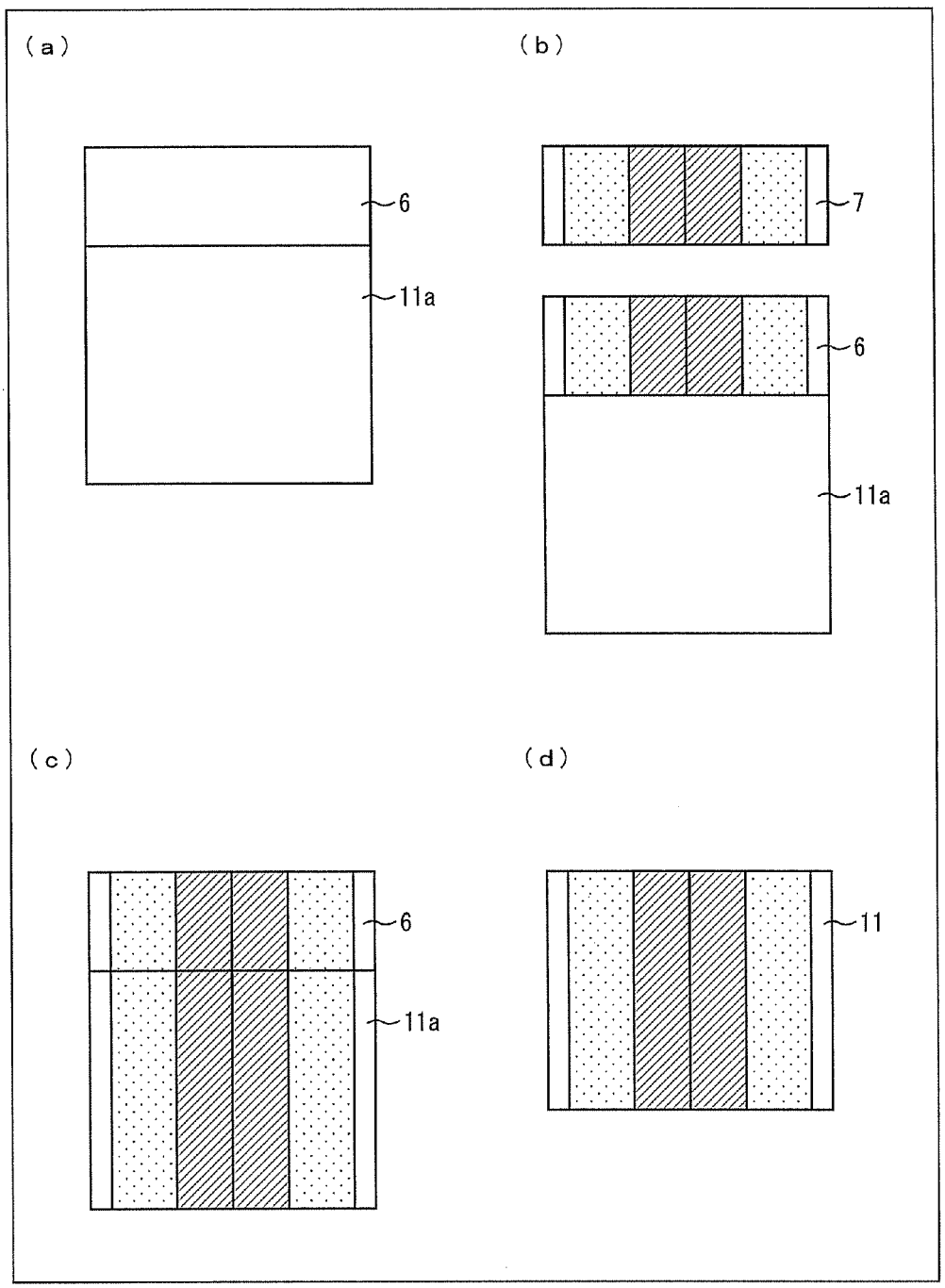
FIG. 13
FIG. 13 is a cross-sectional view illustrating a method for manufacturing a recording head of the present invention.

Next, with reference to (a) through (d) of FIG. 13, the following describes a method for manufacturing the near-field light generating device 10 of the present embodiment. (a) of FIG. 13 is a diagram illustrating a metallic member coated with a photoresist, (b) of FIG. 13 is a diagram illustrating mask exposure being performed on the photoresist in (a) of FIG. 13, (c) of FIG. 13 is a diagram illustrating patterning by use of the photoresist in (b) of FIG. 13, and (d) of FIG. 13 is a diagram illustrating a metallic member from which the photoresist in (c) FIG. 13 has been removed.

(a) through (d) of FIG. 13 are diagrams in which the near-field light generating device 10 is viewed from the −Y direction.

First, as illustrated in (a) of FIG. 13, a surface of a metallic material 11a which serves as the metallic member 11 is coated with a photoresist 6 with the use of a spin coater or the like. Then, as illustrated in (b) of FIG. 13, the photoresist 6 coating the metallic material 11a is exposed to light and is developed with the use of a mask 7 corresponding to a cross-sectional shape of the metallic member 11 (cross-sectional shape parallel to the X-Y plane). As a result, the photoresist is patterned so as to have a shape corresponding to the pattern of the mask 7.

As illustrated in (c) of FIG. 13, the metallic material 11a is etched by using, as a mask, the photoresist 6 thus patterned. As a result, the metallic material 11a is patterned so as to have a shape corresponding to the pattern of the photoresist 6. As illustrated in (d) of FIG. 13, the photoresist 6 is removed. Thus, the metallic member 11 is formed. In a case where a material of the dielectric member 12 is air, the near-field light generating device 10 is thus completed.

In a case where the dielectric member 12 is made of a material other than air, a film of a dielectric material is formed by carrying out sputtering or vapor deposition from above the patterned photoresist 6 illustrated in (c) of FIG. 13, and then the photoresist 6 and an unnecessary portion of the dielectric material are removed. Thus, the near-field light generating device 10 is formed.

The near-field light generating device 10 can also be formed in such a manner that the dielectric member 12 is formed first by etching a part of a dielectric material by a method such as that described above, and then, the metallic member 11 is formed. Alternatively, the near-field light generating device 10 can be formed in such a manner that a film of the metallic member 11 or the dielectric member 12 is formed on a substrate first, and then, the aforementioned steps are carried out.

The aforementioned steps can be carried out from the Z-direction, or can be carried out from the Y-direction by anisotropic etching.

The etching is performed by a wet etching process or a dry etching process such as an ion etching process and a reactive ion etching (RIE) process. For the exposure, an aligner or a stepper is mainly used. Instead of etching, it is possible to employ a process using FIB (Focused Ion Beam) exposure, electron beam exposure, or nanoimprinting.

(Recording Head)

Figure 14:
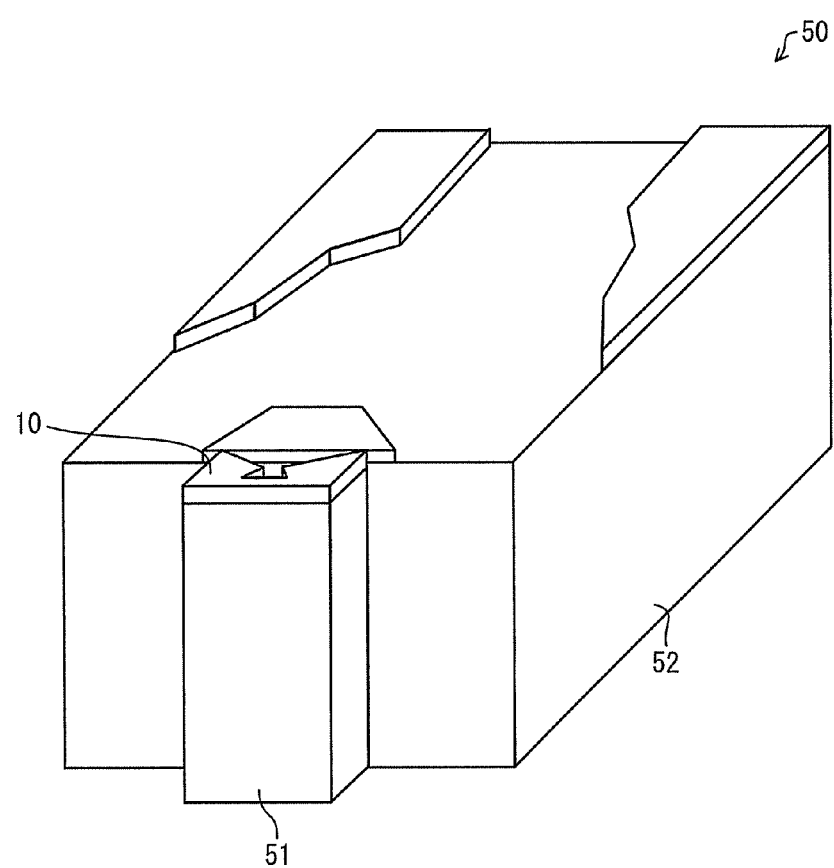
FIG. 14
FIG. 14 is a perspective view illustrating a recording head of the present invention.
Figure 15:
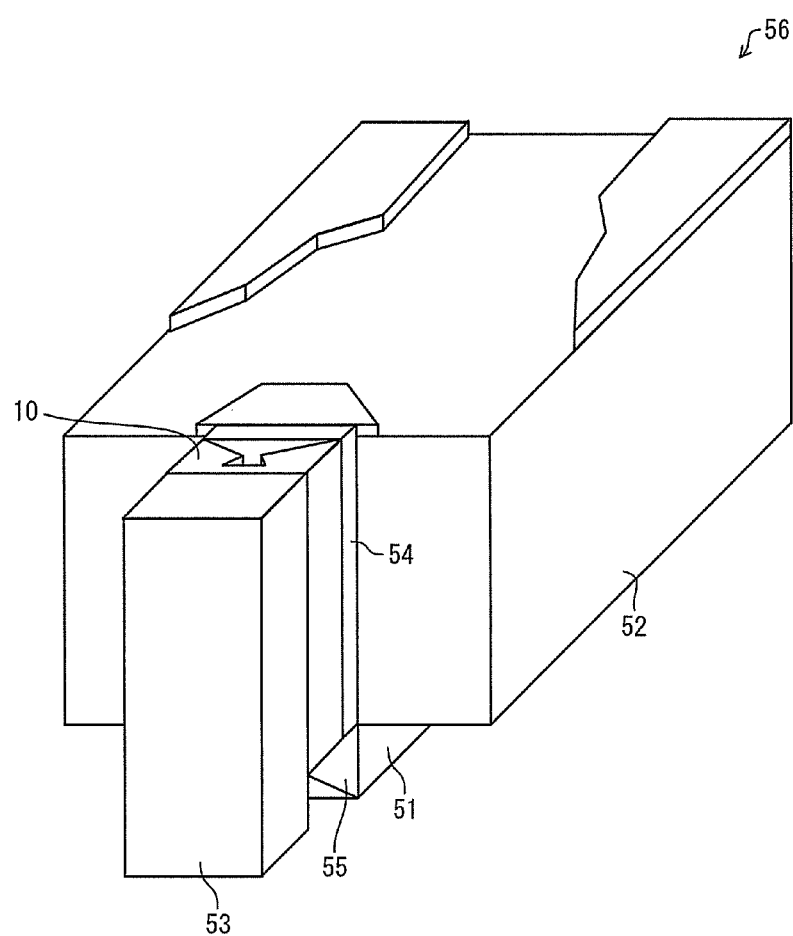
FIG. 15
FIG. 15 is a perspective view illustrating a recording head of the present invention.

Next, with reference to FIGS. 14 and 15, the following describes a recording head including the near-field light generating device 10.

FIG. 14 is a perspective view illustrating an arrangement of a recording head 50 including the near-field light generating device 10.

The recording head 50 includes at least the near-field light generating device 10, a light source 51, and a slider 52.

Preferably, the light source 51 is a semiconductor laser, from a viewpoint of downsizing. A wavelength of the semiconductor laser is selected so that surface plasmon polaritons are excited in the near-field light generating device 10. Therefore, the wavelength is preferably selected depending mainly on what is used as a metallic material of the metallic member 11.

In the recording head 50, the light source 51 emits linearly-polarized light into the near-field light generating device 10. This allows the linearly-polarized light emitted from light source 51 to serve as incident light entering the near-field light generating device 10 and allows surface plasmon polaritons to propagate along the first interface 16 and the second interface 18 of the near-field light generating device 10. As a result, near-field light of a high intensity can be obtained. Therefore, for example, in a case where a medium is irradiated with near-field light, the recording head 50 can record, on the medium, a mark of a high S/N ratio.

The light source 51 causes linearly-polarized light to enter the near-field light generating device 10 in such a manner that the linearly-polarized light reaches an area where the flections P16 and P18 are provided. A polarization direction of the linearly-polarized light is a direction (i.e., X-axis direction) perpendicular to a straight line (i.e., Y-axis in FIG. 2) connecting midpoints between the first interface 16 and the second interface 18 in a cross-section (X-Y plane) perpendicular to the first interface 16 and the second interface 18.

This increases an excitation intensity of the surface plasmon polaritons propagating along the first interface 16 and the second interface 18. As a result, an intensity of the near-field light to be obtained is increased. That is, the incident light can be efficiently converted into near-field light whose spot size is small.

Although another polarization direction can be added, the light source 51 emits light containing at least a polarization component of the X-axis direction in which an inner-interface distance becomes minimum at the location of the flections.

In a case where the near-field light generating device 10 is asymmetrical with respect to the Y-axis as is the case of, e.g., the near-field light generating device 40 illustrated in FIG. 12, a polarization direction of the light source 51 can be a direction perpendicular to the first interface 46.

A material of the slider 52 is preferably AlTiC. Instead, the material can be one of materials constituting the light source 51. On a surface of the slider 52, a projection and a depression (ABS) are formed in order that an airflow and an air pressure are controlled for the recording head to stably float above a medium.

The near-field light generating device 10, the light source 51, and the slider 52 are preferably integrated as one unit, as illustrated in FIG. 14, from a viewpoint of downsizing. This allows the recording head 50 to be made small. In addition, there provided no unnecessary optical system. This decreases a possibility of a temporal change such as a misalignment of an optical axis. In addition, this makes it possible to suppress manufacturing costs of the recording head 50.

The near-field light generating device 10 is preferably formed on a light exit surface of the light source 51.

Specifically, the recording head 50 is arranged such that the light source 51 is provided on a surface (side surface) of the slider 52, and on the light exit surface of the light source 51, the near-field light generating device 10 is provided. It is preferable that the light exit surface of the near-field light generating device 10 is flush with a plane containing the ABS on the slider 52 or protrudes toward a medium beyond the plane. This allows the medium to be irradiated, at a sufficiently short range, with the near-field light generated in the near-field light generating device 10.

For control of a refractive index, improvement of adherence, prevention of a short-circuit in the light source 51, etc., another film can be provided between the light source 51 and the near-field light generating device 10. Further, a protective film can be provided on the light exit surface of the near-field light generating device 10.

The light source 51 and the near-field light generating device 10 need not be integrated with each other. In this case, another near-field light generating device and/or an optical system such as a lens and a prism can be provided between the light source 51 and the near-field light generating device 10. In this case, the light source 51 can be provided on a surface of the slider 52 that is not the surface on which the near-field light generating device 10 is provided.

The recording head 50 can be provided so that the Y-axis direction (see FIG. 1 etc.) of the near-field light generating device 10 may be parallel with or perpendicular to a track direction of the medium.

Although the above description has dealt with a case where the near-field light generating device 10 generates only near-field light, the near-field light generating device can also generate a magnetic field. By passing an electric current through the near-field light generating device 10, a magnetic field can be generated at substantially the same position as near-field light since the magnetic field converges on the dielectric member 12 in the second area 14. This makes it possible to realize an optically-assisted magnetic recording head which is highly efficient and easy to manufacture.

Figure 16:
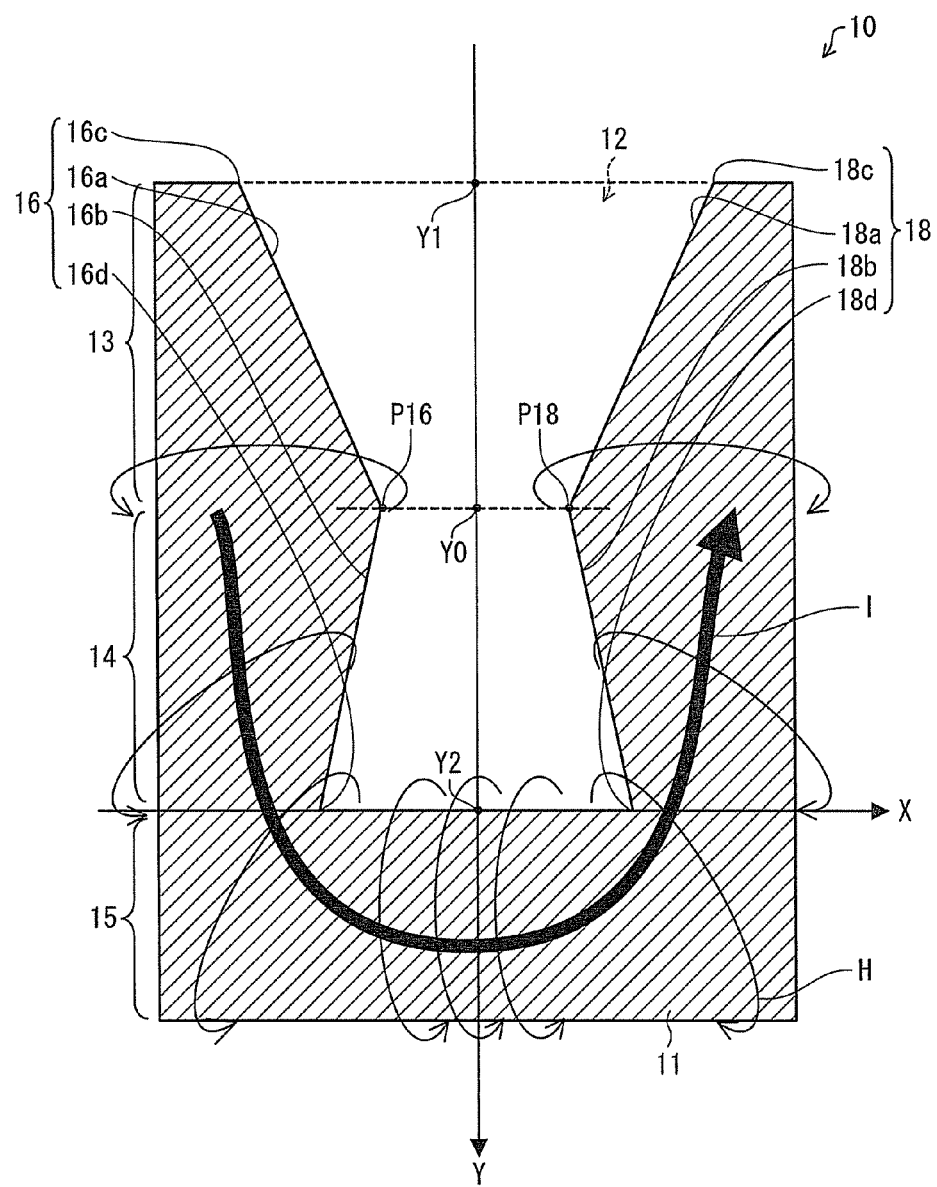
FIG. 16
FIG. 16 is a diagram illustrating an electric current flowing through the near-field light generating device of the present invention and a magnetic field generated in the near-field light generating device of the present invention.

With reference to FIG. 16, the following describes how a magnetic field is generated by passing an electric current through the metallic member 11 of the near-field light generating device 10. When an electric current I is passed through the near-field light generating device 10, a magnetic filed H converges on a bent part of the metallic member 11 (a part of the metallic member 11 that is encompassed within the second area 14 and the third area 15) in accordance with the right-handed screw rule as indicated by the arrows of FIG. 16. Accordingly, in the near-field light generating device 10, the magnetic field H converges between Y0 and Y2. Note that a center of magnetic filed intensities depends on a rate of change in inner-interface distance which changes at the location of the flections P16 and P18.

In the near-field light generating device 10, a rate of change of an inner-interface distance between the first interface 16 and the second interface 18 is asymmetrical with respect to the flections P16 and P18. This allows surface plasmon polaritons propagating along the first interface 16 and the second interface 18 to be converged away from the flections P16 and P18. That is, a position at which near-field light is generated can be adjusted in the vicinity of the flections P16 and P18. Accordingly, a relationship between a position at which a magnetic field is generated and a position at which near-field light is generated can be adjusted.

This changes a duration of time from when a medium is irradiated with near-field light till when a magnetic field is applied. This means that optimization for reducing a size of a mark to be recorded on the medium is possible.

According to a recording head 56, it is thus possible to efficiently adjust a distance between a position at which a magnetic field is generated and a position at which near-field light is generated to an optimum distance so that the position at which a magnetic field is generated and the position at which near-field light is generated coincide not on the recording head 56 but on the medium. That is, according to the recording head 56, a mark of a small spot size can be efficiently recorded based on incident light.

In addition, according to the recording head 56, it is possible to reduce a temporal change of a near-field light intensity. Further, although the recording head 56 has a structure which allows near-field light to be generated in the vicinity of the flections and which does not allow transmission of incident light, it is possible to adjust a position at which near-field light is generated.

Normally, the slider 52 floats at an angle to the medium. According to the recording head 56 including the near-field light generating device 10, the near-field light generating device 10 can adjust a position of near-field light which is generated in the vicinity of the flections P16 and P18. Accordingly, it is possible to bring the position at which near-field light is generated closer to the medium.

Patent Literature 4 and Non-patent Literature 4 for example describe an example of a position at which a magnetic field is generated and a position at which near-field light is generated that are to coincide on a medium. In a case of pulse irradiation, it is preferable that a position to be irradiated with light is 0 nm to 45 nm away from a magnetic field in a direction of rotation of the medium. However, in a case of successive irradiation, it is necessary to increase a distance between the position to be irradiated with light and the position at which a magnetic field is generated.

Note that a distance between a position at which near-field light is generated and a position at which a magnetic field is generated, which is determined so that the positions coincide on a medium, a distance between the light-exit surface of the near-field light generating device 10 and a surface of the medium, etc. depend also on configuration, recording density, linear velocity etc. of the medium, and are appropriately adjusted to optimum ones.

Further, in the recording head 56, the metallic member 11 of the near-field light generating device 10 is disposed so that the first area 13 is closer to the slider 52 than the second area 14, and the second area 14 is closer to the slider 52 than the third area 15. That is, the near-field light generating device 10 is disposed so that the flections P16 and P18 are closer to the slider 52 than the third area 15 of the metallic member 11.

Accordingly, the position Y1, the position Y0, and the position Y2 pass above the medium in this order when magnetic recording is performed on the medium. That is, the vicinity of the flections P16 and P18 passes above the medium first, so that the medium is irradiated with near-field light first. Then, the third area 15 of the metallic member 11 passes above the medium later, so that a magnetic field is applied to a part that has been irradiated with the near-field light.

According to the recording head 56, it is therefore possible to apply a magnetic field by the time of completion of attenuation, from a peak value, of a heat distribution on the medium that is caused by irradiation of near-field light.

Accordingly, it is possible to carry out magnetic recording at a high intensity.

The irradiation order is not limited to this, and it is also possible that the medium is irradiated with a magnetic field first, and is then irradiated with near field light later, provided that a heat intensity distribution caused by the magnetic field and a heat intensity distribution caused by the near-field light overlap each other on the medium.

Further, according to the recoding head 56, a magnetic pole 53 is provided next to the light exit surface of the near-field light generating device 10, and only air is present between the first interface 16 and the second interface 18. Accordingly, light emitted from the light source 51 enters the light incident surface of the near-field light generating device 10 without being reflected by the magnetic pole 53. Consequently, light use efficiency is high.

FIG. 15 is a diagram illustrating another arrangement of the recording head 56.

The recording head 56 is an optically-assisted magnetic recording head which generates a magnetic field to perform magnetic recording on a medium. The following describes differences from the recording head 50 explained with reference to FIG. 14.

The recording head 56 is arranged such that the light source 51 is provided so as to protrude from a surface opposite to a surface of the slider 52 on which surface ABS is provided. On a side surface of the protruding light source 51, a mirror 55 is provided. Note that, instead of using the mirror 55, the recording head 56 may be arranged such that the light source 51 is provided on a side surface of the slider 52 as in FIG. 14.

The recording head 56 is arranged such that a reproducing element 54 is provided on a side surface of the slider 52. The near-field light generating device 10 is provided on a side surface of the reproducing element 54 which side surface is opposite to a surface that is in contact with the slider 52. The magnetic pole 53 is provided on a side surface of the near-field light generating device 10 which side surface is opposite to a surface on which the reproducing element 54 is provided.

That is, the reproducing element 54, the near-field light generating device 10, and the magnetic pole 53 are disposed in this order from the slider 52 side.

In the recording head 56, light emitted from the light source 51 enters the light incident surface of the near-field light generating device 10 after a propagating direction of the light is changed by the mirror 55.

The magnetic pole 53 is, for example, made of a soft magnetic material such as CoFe alloy or FeNi alloy. By winding a coil around the magnetic pole 53 and passing an electric current through the coil, a direction of a magnetic field to be generated can be controlled. In a case where a coil is wound around the magnetic pole 53, an insulating layer is provided between the magnetic pole 53 and the near-field light generating device 10 so that the coil does not become conductive with the near-field light generating device 10.

The reproducing element 54 detects an intensity of a surrounding magnetic field, and can be a known reproducing element such as a GMR element or a TMR element.

The mirror 55 is not limited to a specific one, provided that it can reflect light emitted from the light source 51. The mirror 55 may be made of a dielectric material only. Alternatively, a metal film may be formed on a light reflecting surface.

According to the arrangement of the recording head 56, a magnetic filed is generated from the magnetic pole 53 so that the magnetic field may be generated at substantially the same position as the near-field light exited from the near-field light generating device 10.

That is, according to the recording head 56, near-field light and a magnetic field, which is generated from the magnetic pole 53, can be generated in the vicinity of the light exit surface of the near-field light generating device 10 between the flections P16 and P18 where an inter-interface distance is minimum. By placing, e.g., a medium on a light exit surface side of the near-field light generating device 10, it is possible to perform magnetic recording on the medium.

Further, in the recording head 56, the metallic member 11 of the near-field light generating device 10 is disposed so that the first area 13 is closer to the slider 52 than the second area 14, and the second area 14 is closer to the slider 52 than the third area 15. That is, the near-field light generating device 10 is disposed so that the flections P16 and P18 are closer to the slider 52 than the third area 15 of the metallic member 11. Accordingly, when magnetic recording is performed on the recording medium 67, the position Y1, the position Y0, and the position Y2 pass above the recording medium 67 in this order, and then the magnetic pole 53 passes above the recording medium 67.

The vicinity of the flections P16 and P18 passes above the medium earlier than the magnetic pole 53. This allows the medium to be irradiated with near-field light first. Then, the magnetic pole 53 passes above the medium, so that a magnetic filed can be applied to a part that has been irradiated with the near-field light.

According to the recording head 56, it is therefore possible to apply a magnetic field by the time of completion of attenuation, from a peak value, of a heat distribution on the medium that is caused by irradiation of near-field light.

According the near-field light generating device 10, a rate of change of an inner-interface distance between the first interface 16 and the second interface 18 is asymmetrical with respect to the flections P16 and P18. This allows surface plasmon polaritons propagating along the first interface 16 and the second interface 18 to be converged away from the flections P16 and P18. That is, a position at which near-field light is generated can be adjusted in the vicinity of the flections P16 and P18. This makes it possible to reduce a temporal change of a near-field light intensity and to adjust a relationship between a position at which a magnetic field is generated and a position at which near-field light is generated. Especially in a case where the first vertex angle θ1 of the near-field light generating device 10 is made larger than the second vertex angle θ2 so that the position at which near-field light is generated is shifted towards the third area 15 side, it is possible to bring the position at which near-field light is generated closer to the magnetic pole 53.

Adjusting a relationship between the position at which a magnetic field is generated and the position at which near-field light is generated changes a duration of time from when the medium is irradiated with near-field light till when a magnetic field is applied. This means that optimization for reducing a size of a mark to be recorded on the medium is possible.

That is, in the recording head 56, a distance between a position at which a magnetic field is generated and a position at which near-field light is generated can be adjusted to an optimum one so that the position at which the magnetic field is generated and a distribution of heat generated by the near-field light coincide not on the recording head 56 but on the medium.

Patent Literature 4 and Non-patent Literature 4 for example describe an example of a position at which a magnetic field is generated and a position at which near-field light is generated that are determined so as to coincide on the medium. In a case of pulse irradiation, it is preferable that a position to be irradiated with light is 0 nm to 45 nm away from a magnetic field in a direction of rotation of the medium. However, in a case of successive irradiation, it is necessary to increase a distance between the position to be irradiated with light and the position at which a magnetic field is generated. Note that a distance between a position at which near-field light is generated and a position at which a magnetic field is generated, which are determined so as to coincide on the medium, and a distance between the light-exit surface of the near-field light generating device 10 and a surface of the medium, etc. depend also on configuration, recording density, linear velocity etc. of the medium, and are appropriately adjusted to optimum ones.

According to the arrangement, it is possible to provide a recording head that can perform high-density magnetic recording.

The irradiation order is not limited to this, and it is also possible that the medium is irradiated with a magnetic field first, and is then irradiated with near field light later, provided that a heat intensity distribution caused by the magnetic field and a heat intensity distribution caused by the near-field light overlap each other on the medium.

In addition, according to the recording head 56, it is possible to reduce a temporal change of a near-field light intensity. Further, although the recording head 56 has a structure which allows near-field light to be generated in the vicinity of the flections and which does not allow transmission of incident light, it is possible to adjust a position at which near-field light is generated.

Further, according to the recoding head 56, the magnetic pole 53 is provided next to the light exit surface of the near-field light generating device 10, and only air or a dielectric member is present between the first interface 16 and the second interface 18. Accordingly, light emitted from the light source 51 enters the light incident surface of the near-field light generating device 10 without being reflected by the magnetic pole 53. Consequently, light use efficiency is high.

Figure 22:
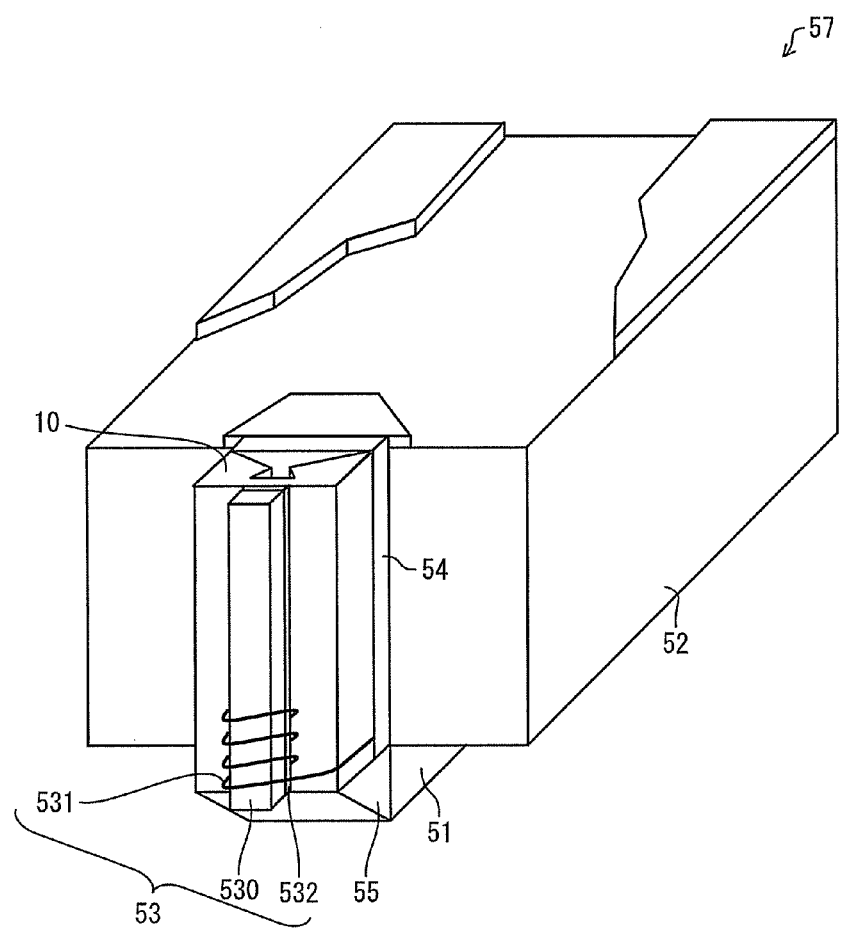
FIG. 22
FIG. 22 is a perspective view illustrating a recording head of the present invention.

The following describes a modification of the recording head 56 shown in FIG. 15 with reference to FIG. 22. FIG. 22 is a diagram illustrating an arrangement of a recording head that is different from the recording head 56. The following description deals with differences from the recording head 56.

According to the arrangement of the recording head 57, the magnetic pole 53 passes an electric current through the near-field light generating device 10 so that a magnetic field may be generated at substantially the same position as the near-field light exited from the near-field light generating device 10. This has been described in detail with reference to FIG. 16.

The magnetic pole 53 includes a main magnetic pole 530, a coil 531, and an insulating layer 532. The coil 531 is wound around the main magnetic pole 530. The insulating layer 532 is provided between the main magnetic pole 530 and the near-field light generating device 10. In this arrangement, an electric current is passed, from the coil 531, through the metallic member 11 included in the near-field light generating device 10, so that a magnetic field is generated in the vicinity of the light exit surface of the near-field light generating device 10 between the flections P16 and P18 where an inner-interface distance is minimum.

As described above, according to the recording head 57, near-field light and a magnetic field can be generated in the vicinity of the light exit surface of the near-field light generating device 10 between the flections P16 and P18 where an inner-interface distance is minimum. Accordingly, by placing, e.g., a medium on a light exit surface side of the near-field light generating device 10, it is possible to perform magnetic recording on the medium.

In a case where a direction of the electric current passed through the coil 531 is opposite to a direction of an electric current passed through the metallic member 11 when viewed from the medium (i.e., when viewed from an object to be irradiated with near-field light), the magnetic pole 53 also serves as a return yoke for a magnetic field generated in the metallic member 11. Specifically, a pathway is formed through which a magnetic field generated by passing an electric current through the metallic member 11 returns to the magnetic pole 53 via the medium. This suppresses expansion of the magnetic field thus generated and reduces a size of a magnetic bit to be recorded on the medium.

Further, the magnetic field generated in the metallic member 11 can strengthen the magnetic field generated from the magnetic pole 53.

Since the near-field light generating device 10 allows a reduction in spot size of near-field light, it is also possible to reduce a size of a magnetic bit to be recorded on the medium. Consequently, according to the arrangement, it is possible to provide a recording head that can perform high-density magnetic recording.

(Recording Device)

Figure 17:
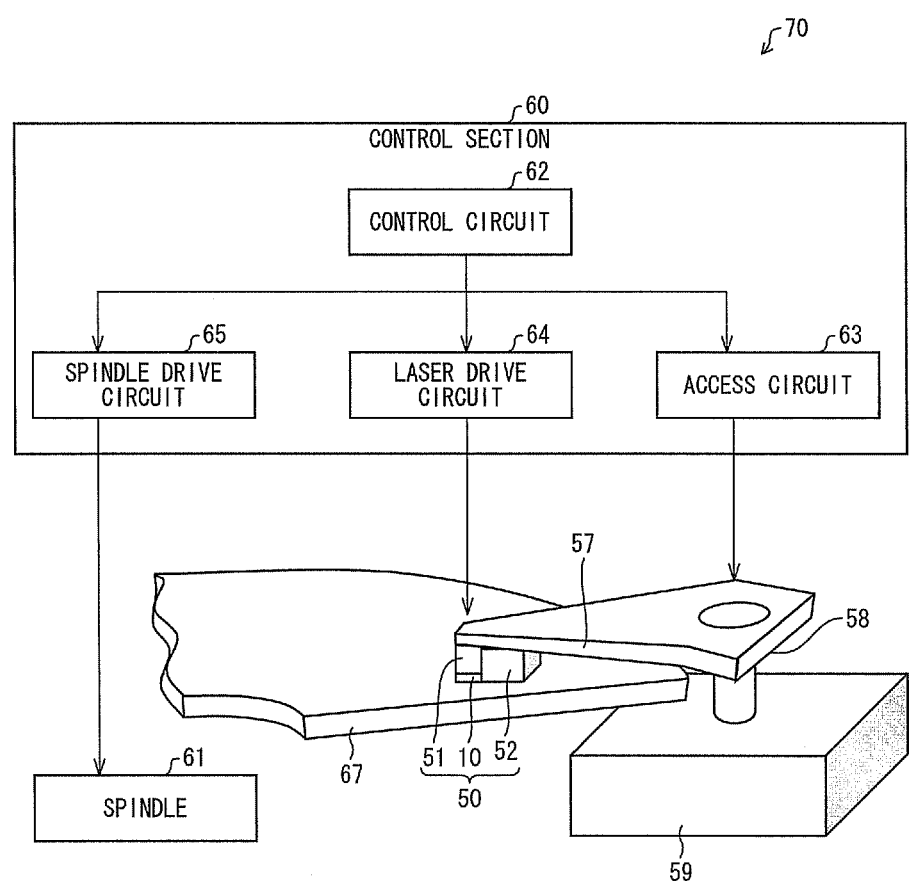
FIG. 17
FIG. 17 is a perspective view illustrating a recording device including the recording head of the present invention.

With reference to FIG. 17, the following describes a recording device 70 for performing optical recording by using the recording head of the present embodiment. The aforementioned recording heads 50, 56, and 57 are applicable to the recording device 70 of the present embodiment. The following deals with the recording device 70 using the recording head 50.

FIG. 17 is a diagram illustrating an arrangement of the recording device 70 using the recording head 50 of the present embodiment.

As illustrated in FIG. 17, the recording device 70 includes a spindle 61, a driving section 59, and a control section 60. The recording device 70 is a device for recording information on a recording medium (object to be irradiated) 67 by use of at least light.

The spindle 61 corresponds to a spindle motor for rotating the recording medium 67. The drive section 59 includes an arm 57, a rotary shaft 58, and the recording head 50. The arm 57 is a member for moving the recording head 50 in a substantially radial direction of the disk-shaped recording medium 67, and is a support of a swing-arm mechanism. The arm 57 is supported by the rotary shaft 58 so as to rotate around the rotary shaft 58. The recording head 50 including the slider 52 is a member for floating above the recording medium 67 at a predetermined distance. The near-field light generating device 10 and the light source 51 of the present invention is provided to the slider 52 so that the recording medium 67 is irradiated with an optical spot.

The control section 60 includes a control circuit 62, an access circuit 63, a recording circuit 64, and a spindle drive circuit 65. The access circuit 63 is a circuit for controlling a rotational position of the arm 57 of the drive section 59 so that the slider 52 may move to a target position on the recording medium 67. The recording circuit 64 is a circuit for controlling a light intensity and an irradiation time of the light source 51 of the recording head 50. The spindle drive circuit 65 is a circuit for controlling rotary drive of the recording medium 67. The control circuit 62 is a circuit for overall control of the access circuit 63, the recording circuit 64, and the spindle drive circuit 65.

The following describes how the recording device 70 operates, with reference to FIG. 17.

When the recording device 70 performs, on the recording medium 67, recording, reproduction etc. of information, in other words, when the recording device 70 operates, the spindle drive circuit 65 in the control section 60 causes the spindle 61 on which the recording medium 67 is mounted to rotate at a proper number of rotations. The access circuit 63 in the control section 60 causes the drive section 59 to move so that the slider 52 may move to a target position on the recording medium 67.

The recording circuit 64 causes the light source 51 to emit light at a predetermined intensity and a predetermined time interval. Specifically, the recording circuit 64 causes the light source 51 to emit light so that the light may enter the near-field light generating device 10. This generates a near-field light spot. As a result, the recording medium 67 is irradiated with the near-field light spot. In a case where a magnetic field is utilized in addition to light, the recording circuit 64 controls an intensity and a time interval of the magnetic field so that, the recording medium 67 is irradiated with the magnetic field. In this case, the light source 51 can perform time control in a similar way as the magnetic field, or keep emitting light.

Thus, optical spots are generated at intensities and time intervals in accordance with light emission of the light source 51. Accordingly, marks are recorded on the recording medium 67 by the optical spots. The control circuit 62 collectively controls the light emission of the light source 51, the operation of the drive section 59, and the rotation of the spindle 61 so as to issue instructions to each circuit, thereby allowing intended recording at a target position.

The recording medium 67 is an optical recording medium on which information is recorded by light, and is a phase-change medium. In this case, a recording layer of the recording medium 67 is heated by an optical spot so as to change from crystalline to amorphous. As a result, the heated recording layer is converted into a recorded mark.

The recording medium 67 can be a magneto-optical recording medium on which information is recorded by light and a magnetic field. In this case, a recording layer of the recording medium 67 is heated by an optical spot. Simultaneously, a magnetic filed is applied to the recording layer. Accordingly, an orientation of a magnetic moment in the recording layer is reversed. As a result, the recording layer is converted into a recorded mark. According to the arrangement of the present invention, as described above, a magnetic field can be generated at substantially the same position as the near-field light spot in the vicinity of the flections P16 and P18, by passing an electric current through the near-field light generating device 10. By changing a direction of the electric current to be passed through the near-field light generating device 10, it is possible to change, upwards or downwards, a direction of the magnetic field to be applied to the recording medium 67.

A speed of formation of a recorded mark of the recording medium 67, i.e., a recording speed depends on a speed of temperature increase of the recording layer. The speed of temperature increase depends on a light intensity of an optical spot to be applied to the recording layer. That is, the higher the intensity of the optical spot, the shorter the time required for heating the recording medium 67 to a required temperature. This results in an increase in transfer rate.

Since the recording device 70 includes the recording head 50, it is possible to provide a small and inexpensive recording device whose temporal change is small, and which is capable of recording a mark of a high S/N ratio on a medium loaded in the recording device, and which is capable of performing high-density optically-assisted magnetic recording.

The present invention is not limited to the description of the embodiments above, but may be altered by a skilled person within the scope of the claims. An embodiment based on a proper combination of technical means disclosed in different embodiments is encompassed in the technical scope of the present invention.

[Supplement]

The following is a supplementary description. The recording head 56 is an optically-assisted magnetic recording head which generates a magnetic field so as to perform magnetic recording on a medium. The recording head 56 is arranged such that the light source 51 is provided so as to protrude from a surface opposite to a surface of the slider 52 on which surface ABS is provided. On a side surface of the protruding light source 51, a mirror 55 is provided. The reproducing element 54 is provided on a side surface of the slider 52. The near-field light generating device 10 is provided on the reproducing element 54. The magnetic pole 53 is provided on a side surface of the near-field light generating device 10 which side surface is opposite to a surface on which the reproducing element 54 is provided. That is, the reproducing element 54, the near-field light generating device 10, and the magnetic pole 53 are disposed in this order from the slider 52 side. In the recording head 56, light emitted from the light source 51 enters the light incident surface of the near-field light generating device 10 after a propagating direction of the light is changed by the mirror 55.

The magnetic pole 53 may be arranged such that the main magnetic pole is disposed outside the near-field light generating device 10, as in Patent Literature 3.

It is also possible that the magnetic pole 53 is not used, and instead the near-field light generating device 10 serves also as a magnetic field generating section 53. Specifically, an electric current I is passed through the near-field light generating device 10 (see the arrow I in FIG. 16) so that an magnetic field H (see the arrow H in FIG. 16) is generated in accordance with the right-handed screw rule. In this case, the magnetic pole 53 can be omitted.

As described above, a near-field light generating device of the present invention which converts incident light into near-field light, includes: a metallic member made of a metallic material; and a dielectric member made of a dielectric material, the metallic member having a first interface and a second interface that sandwich the dielectric member, at least one of the first interface and the second interface having a flection, an inner-interface distance, which is a distance between the first interface and the second interface, being minimum at a location of the flection, and a rate of change of the inner-interface distance between the first interface and the second interface being asymmetrical with respect to the flection.

According to the arrangement, the metallic member has a first interface and a second interface that sandwich the dielectric member. This allows incident light entering the metallic member to be converted into surface plasmon polaritons by the first interface and the second interface.

Further, according to the arrangement, at least one of the first interface and the second interface has a flection, and an inner-interface distance, which is a distance between the first interface and the second interface, is minimum at a location of the flection.

This allows surface plasmon polaritons propagating along the first interface and the second interface to be converged in the vicinity of the flection where an effective refractive index is largest.

That is, according to the arrangement, it is possible to change a propagating direction of the surface plasmon polaritons excited on a light incident surface side of the first interface and the second interface and to converge the surface plasmon polaritons in the vicinity of the flection on a light exit surface side of the first interface and the second interface. The surface plasmon polaritons thus converged in the vicinity of the flection are minute surface plasmon polaritons of high intensity.

This makes it possible to emit, from the light exit surface of the near-field light generating device, near-field light of a minute spot size and of a high intensity.

According to the arrangement, it is thus possible to efficiently convert incident light into near-field light whose spot size is small.

Further, according to the arrangement, a rate of change of the inner-interface distance between the first interface and the second interface is asymmetrical with respect to the flection.

This allows surface plasmon polaritons propagating along the first interface and the second interface to be converged away from the flection. This makes it possible to reduce a heat-induced temporal change in shape of the flection where the inner-interface distance is minimum. That is, it is possible to reduce a temporal change in intensity of generated near-field light.

Further, according to the arrangement, the flection is provided so that a rate of change of the inner-interface distance between the first interface and the second interface is asymmetrical with respect to the flection. Accordingly, the flection for converging surface plasmon polaritons is easier to create, as compared with the arrangement in which surface plasmon polaritons are converged on a tip of a V-shaped groove.

According to the arrangement, it is therefore possible to provide a near-field light generating device that can be easily fabricated and that can obtain minute near-field light whose intensity is high and undergoes a small temporal change.

It is preferable that each of a first vertex angle and a second vertex angle is larger than 0° and less than 180°, the first vertex angle being an angle which is formed by an extended line from the first interface and an extended line from the second interface and which is located in a first area, the second vertex angle being an angle which is formed by an extended line from the first interface and an extended line from the second interface and which is located in a second area, the first area and the second area being areas which the first interface and the second interface face and being bordered from each other in reference to the flection.

According to the arrangement, the inner-interface distance is equal to or larger than a wavelength of incident light. This makes it possible to reduce an area of the first interface and the second interface through which area the incident light passes without exciting surface plasmon polaritons and to keep the area away from an area where near-field light is generated. Accordingly, it is possible to eliminate background noise of obtained near-field light or to reduce an effect of the background noise.

It is preferable that at least one of the first vertex angle and the second vertex angle is larger than 0° and not more than 90°.

According to the arrangement, it is possible to further reduce the area of the first interface and the second interface through which area the incident light passes without exciting surface plasmon polaritons and to keep the area away from the area where near-field light is generated. Accordingly, it is possible to eliminate background noise of obtained near-field light or to reduce an effect of the background noise.

It is preferable that the second vertex angle is smaller than the first vertex angle. According to the arrangement, by causing incident light to enter the near-field light generating device so that a center of intensities is located in the second area, it is possible to prevent the incident light from passing through the near-field light generating device without exciting surface plasmon polaritons. Consequently, according to the arrangement, it is possible to improve use efficiency of incident light.

It is preferable that ends of the first interface and the second interface which ends are encompassed in the second area are connected to each other.

According to the arrangement, by adjusting a distance between the flection and the ends connected to each other, it is possible to adjust a position at which near-field light is generated. Further, by passing an electric current through the metallic member, it is possible to generate a magnetic field.

It is preferable that an inner-interface distance between the ends of the first interface and the second interface which ends are encompassed in the second area is smaller than an inner-interface distance between ends of the first interface and the second interface which ends are encompassed in the first area.

According to the arrangement, by causing incident light to enter the near-field light generating device so that a center of intensities is located in the second area, it is possible to prevent the incident light from passing through the near-field light generating device without exciting surface plasmon polaritons. Consequently, according to the arrangement, it is possible to improve use efficiency of incident light.

It is preferable that both of the first interface and the second interface have a flection, and the first interface and the second interface are symmetrical to each other.

According to the arrangement, an electric field component of surface plasmon polaritons acting between the first interface and the second interface is always oriented in a certain direction. This decreases a loss of the surface plasmon polaritons propagating along the first interface and the second interface. As a result, an intensity of a near-field light spot to be obtained is increased. That is, incident light can be efficiently converted into near-field light whose spot size is small.

It is preferable that the incident light which enters the near-field light generating device is linearly-polarized light, and a polarization direction of the linearly-polarized light includes at least a polarization direction perpendicular to a straight line connecting midpoints between the first interface and the second interface in a cross-section perpendicular to the first interface and the second interface.

The arrangement increases an excitation intensity of the surface plasmon polaritons propagating along the first interface and the second interface. As a result, an intensity of the near-field light to be obtained is increased. That is, the incident light can be efficiently converted into near-field light whose spot size is small.

It is preferable that only the dielectric member is disposed in an area sandwiched between the first interface and the second interface, and the dielectric member is made of a dielectric material which allows transmission of the incident light that enters the near-field light generating device.

According to the arrangement, only a dielectric material which allows transmission of the incident light that enters the near-field light generating device is present between the first interface and the second interface. Since there is nothing which shields light entering between the first interface and the second interface, the light entering between the first interface and the second interface can be efficiently converted into near-field light.

It is preferable that a recording head of the present invention includes: the near-field light generating device; and a light source for emitting light into the near-field light generating device.

According to the arrangement, the light emitted from the light source is used as the incident light entering the near-field light generating device so that surface plasmon polaritons propagate along the first interface and the second interface. As a result, it is possible to obtain high-intensity near-field light in the near-field light generating device.

This makes it possible to provide a recording head which can record a mark of a high S/N ratio, for example, by irradiating a recording medium with the near-field light.

Further, it is preferable that a recording head of the present invention includes: the near-field light generating device; and a light source for emitting the linearly-polarized light into the near-field light generating device in such a manner that the linearly-polarized light reaches an area where the flection is provided.

The arrangement increases an excitation intensity of the surface plasmon polaritons propagating along the first interface and the second interface. As a result, an intensity of the near-field light to be obtained is increased. That is, the incident light can be efficiently converted into near-field light whose spot size is small.

It is preferable that the light source and the near-field light generating device are integrated as one unit.

According to the arrangement, a small recording head can be realized. In addition, there provided no unnecessary optical system. This decreases a possibility of a temporal change such as a misalignment of an optical axis. In addition, this makes it possible to suppress manufacturing costs of the recording head.

It is preferable that the recording head further includes a magnetic field generation section for passing an electric current through the metallic member in the near-field light generating device so as to generate a magnetic field in the vicinity of a light exit surface of the near-field light generating device between the flections where the inner-interface distance is minimum.

According to the arrangement, it is possible to generate the near-field light and a magnetic field in the vicinity of the light exit surface of the near-field light generating device between the flections where the inner-interface distance is minimum. Accordingly, by placing, e.g., a medium on a light exit surface side of the near-field light generating device, it is possible to perform magnetic recording on the medium.

In addition, the near-field light generating device makes it possible to reduce a spot size of the near-field light. This allows a reduction of a size of the magnetic bit to be recorded on the medium. Consequently, according to the arrangement, it is possible to provide a recording head that is capable of performing high-density magnetic recording.

It is preferable that the recording head further includes a magnetic pole for generating a magnetic field.

The near-field light generating device makes it possible to reduce a spot size of the near-field light. Accordingly, in a case where the recording head further includes a magnetic pole, it is also possible to reduce a size of a magnetic bit to be recorded on the medium. Consequently, according to the arrangement, it is possible to provide a recording head that is capable of performing high-density magnetic recording.

It is preferable that the recording head further includes a magnetic pole that is adjacent to the metallic member, the magnetic pole including: a coil through which an electric current is passed; and an insulating layer provided on a surface of the magnetic pole which surface is adjacent to the metallic member, the electric current passing through the coil being passed through the metallic member, and a direction of the electric current passing through the coil is opposite to a direction of the electric current passing through the metallic member when viewed from an object to be irradiated with the near-field light.

According to the arrangement, the magnetic pole can serve as a return yoke for a magnetic field generated in the metallic member. Specifically, a pathway is formed through which a magnetic field generated by passing an electric current through the metallic member returns to the magnetic pole via the object to be irradiated. This suppresses expansion of the magnetic field thus generated and reduces a size of a magnetic bit to be recorded on the medium. Further, the magnetic field generated in the metallic member can strengthen the magnetic field generated from the magnetic pole.

It is preferable that a recording device of the present invention includes the recording head.

The arrangement makes it possible to realize: a recording device capable of recording a mark of a high S/N ratio on a medium loaded in the recording device; a small low-cost recording device having a small temporal change; or a recording device capable of high-density optically-assisted magnetic recording.

INDUSTRIAL APPLICABILITY

The present invention is suitably applicable to a recording device for performing optical recording on a recording medium.

REFERENCE SIGNS LIST 10, 20, 30, 40: Near-field light generating device
11, 21, 31, 41: Metallic member
12, 22, 32, 42: Dielectric member
13, 23, 33, 43: First area
14, 24, 34, 44: Second area
16, 26, 36, 46: First interface
16c, 26c, 36c, 46c: End (one end)
16d, 26d, 36d, 46d: End (the other end)
18, 28, 38, 48: Second interface
18c, 28c, 38c, 48c: End (one end)
18d, 28d, 38d, 48d: End (the other end)
50, 56: Recording head 51: Light source
53: Magnetic pole (magnetic field generation section)
P16, P26, P36: Flection
P18, P28, P38, P48: Flection
θ1: First vertex angle
θ2: Second vertex angle

The invention claimed is:

1. A near-field light generating device which converts incident light into near-field light, comprising:
a metallic member made of a metallic material; and
a dielectric member made of a dielectric material,
the metallic member having a first interface and a second interface that sandwich the dielectric member,
at least one of the first interface and the second interface having a flection,
an inner-interface distance, which is a distance between the first interface and the second interface, being minimum at a location of the flection, and
a rate of change of the inner-interface distance between the first interface and the second interface being asymmetrical with respect to the flection.

2. The near-field light generating device according to claim 1, wherein:
each of a first vertex angle and a second vertex angle is larger than 0° and less than 180°,
the first vertex angle being an angle which is formed by an extended line from the first interface and an extended line from the second interface and which is located in a first area,
the second vertex angle being an angle which is formed by an extended line from the first interface and an extended line from the second interface and which is located in a second area,
the first area and the second area being areas which the first interface and the second interface face and being bordered from each other in reference to the flection.

3. The near-field light generating device according to claim 2, wherein:
at least one of the first vertex angle and the second vertex angle is larger than 0° and not more than 90°.

4. The near-field light generating device according to claim 2, wherein:
the second vertex angle is smaller than the first vertex angle.

5. The near-field light generating device according to claim 2, wherein:
ends of the first interface and the second interface which ends are encompassed in the second area are connected to each other.

6. The near-field light generating device according to claim 2, wherein:
an inner-interface distance between the ends of the first interface and the second interface which ends are encompassed in the second area is smaller than an inner-interface distance between ends of the first interface and the second interface which ends are encompassed in the first area.

7. The near-field light generating device according to claim 1, wherein:
both of the first interface and the second interface have a flection, and the first interface and the second interface are symmetrical to each other.

8. The near-field light generating device according to claim 1, wherein:
the incident light which enters the near-field light generating device is linearly-polarized light, and
a polarization direction of the linearly-polarized light is a direction in which a shortest line connecting the first interface and the second interface extends, the shortest line passing through the flection.

9. The near-field light generating device according to claim 1, wherein:
only the dielectric member is disposed in an area sandwiched between the first interface and the second interface, and
the dielectric member is made of a dielectric material which allows transmission of the incident light that enters the near-field light generating device.

10. A recording head comprising:
a near-field light generating device as set forth in claim 1; and
a light source for emitting light into the near-field light generating device.

11. A recording head comprising:
a near-field light generating device as set forth in claim 8; and
a light source for emitting the linearly-polarized light into the near-field light generating device in such a manner that the linearly-polarized light reaches an area where the flection is provided.

12. The recording head according to claim 10, wherein:
the light source and the near-field light generating device are integrated as one unit.

13. The recording head according to claim 10, further comprising a magnetic field generation section for passing an electric current through the metallic member in the near-field light generating device so as to generate a magnetic field in the vicinity of a light exit surface of the near-field light generating device between the flections where the inner-interface distance is minimum.

14. The recording head according to claim 10, further comprising a magnetic pole for generating a magnetic field.

15. The recording head according to claim 13, further comprising a magnetic pole that is adjacent to the metallic member,
the magnetic pole including: a coil through which an electric current is passed; and an insulating layer provided on a surface of the magnetic pole which surface is adjacent to the metallic member,
the electric current passing through the coil being passed through the metallic member, and
a direction of the electric current passing through the coil is opposite to a direction of the electric current passing through the metallic member when viewed from an object to be irradiated with the near-field light.

16. A recording device comprising a recording head as set forth in claim 10.

* * * * *